United States Patent [19]

Lindbom et al.

[11] 4,224,501
[45] Sep. 23, 1980

[54] TEACHING ARRANGEMENT FOR PROGRAMMABLE MANIPULATOR

[75] Inventors: Torsten H. Lindbom, Brookfield; Donald W. Munger, New Milford, both of Conn.

[73] Assignee: Unimation, Inc., Danbury, Conn.

[21] Appl. No.: 881,395

[22] Filed: Feb. 27, 1978

[51] Int. Cl.$^2$ .............................. B23K 9/12; B25J 9/00
[52] U.S. Cl. ............................ 219/124.34; 219/125.1; 318/568; 414/4
[58] Field of Search ........... 219/124.34, 125.1, 125.11, 219/125.12, 124.22; 214/1 CM; 318/568

[56] References Cited

U.S. PATENT DOCUMENTS

| | | | |
|---|---|---|---|
| 3,267,251 | 8/1966 | Anderson | 219/125.1 |
| 3,555,239 | 1/1971 | Kerth | 219/124.34 |
| 3,657,511 | 4/1972 | Friedman et al. | 219/124.34 |
| 3,783,253 | 1/1974 | Anderson et al. | 318/568 |
| 3,845,284 | 10/1974 | Taguchi et al. | 214/1 CM |
| 4,030,617 | 6/1977 | Richter | 214/1 CM |
| 4,115,684 | 9/1978 | Lindbom | 219/125.1 |
| 4,116,143 | 9/1978 | Manabe | 318/568 |

FOREIGN PATENT DOCUMENTS 2712169  10/1977  Fed. Rep. of Germany ....... 214/1 CM Primary Examiner—Bruce A. Reynolds
Assistant Examiner—Clifford C. Shaw
Attorney, Agent, or Firm—Mason, Kolehmainen, Rathburn & Wyss

[57] ABSTRACT

A manipulator apparatus having a manipulator arm movable in a plurality of axes is programmed and taught to perform a desired sequence of operations over selected work paths. Basic control parameters relating to movement of the arm independent of the length and orientation of the work paths are programmed by a supervisor/programmer on the controls of a supervisory control unit. The control parameters represent manipulator work parameters and manipulator arm movement different than the taught work paths in a subsequent second teach phase.

An operator/programmer in a teach phase proceeds to guide the manipulator arm over the predetermined work paths in contact with a work surface. The work paths are taught or programmed by the automatic recording into a main control memory of positional data. During the teach phase, the control parameters stored in the supervisory control unit are automatically recorded into the main control memory for each of the work paths in a predetermined relationship to the recorded positional data points. The recorded signals are utilized as command signals in subsequent playback cycles.

Between sequential work paths in the overall work cycle or work path sequence, transfer steps corresponding to manipulator arm movement not in contact with the work surface are also taught by the recording of data into the main control memory during the teach phase.

55 Claims, 10 Drawing Figures

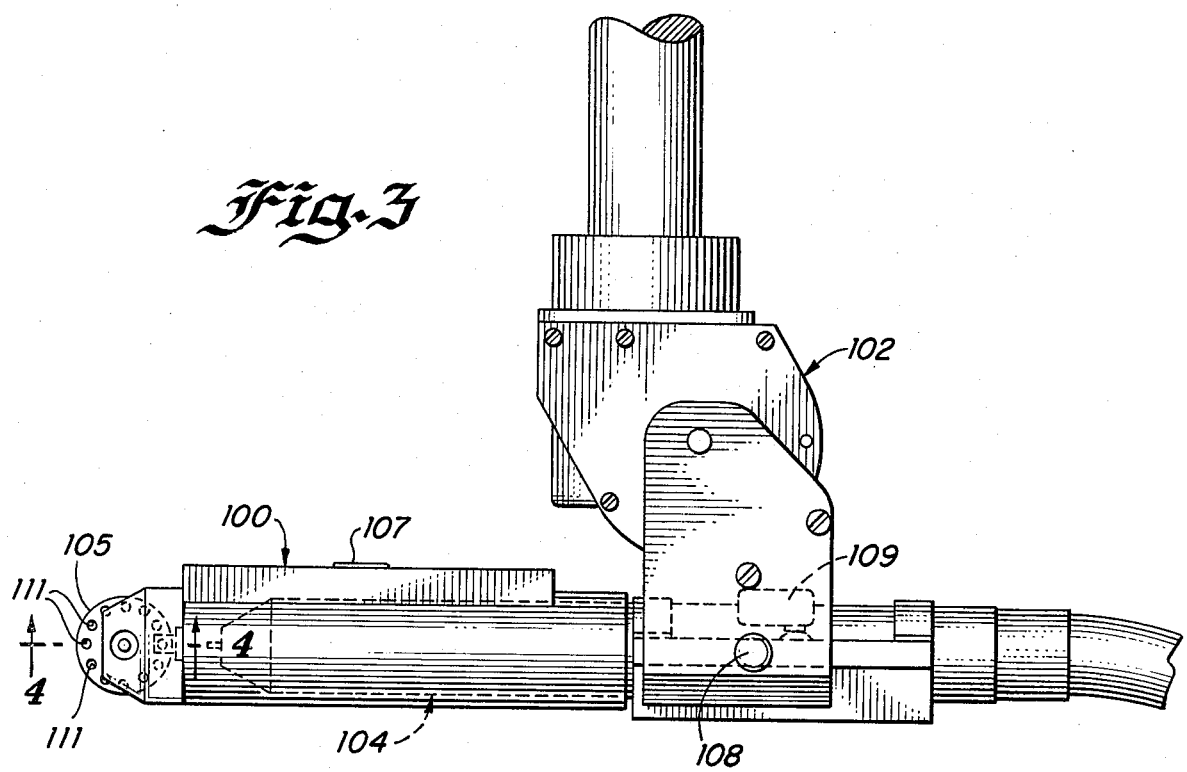
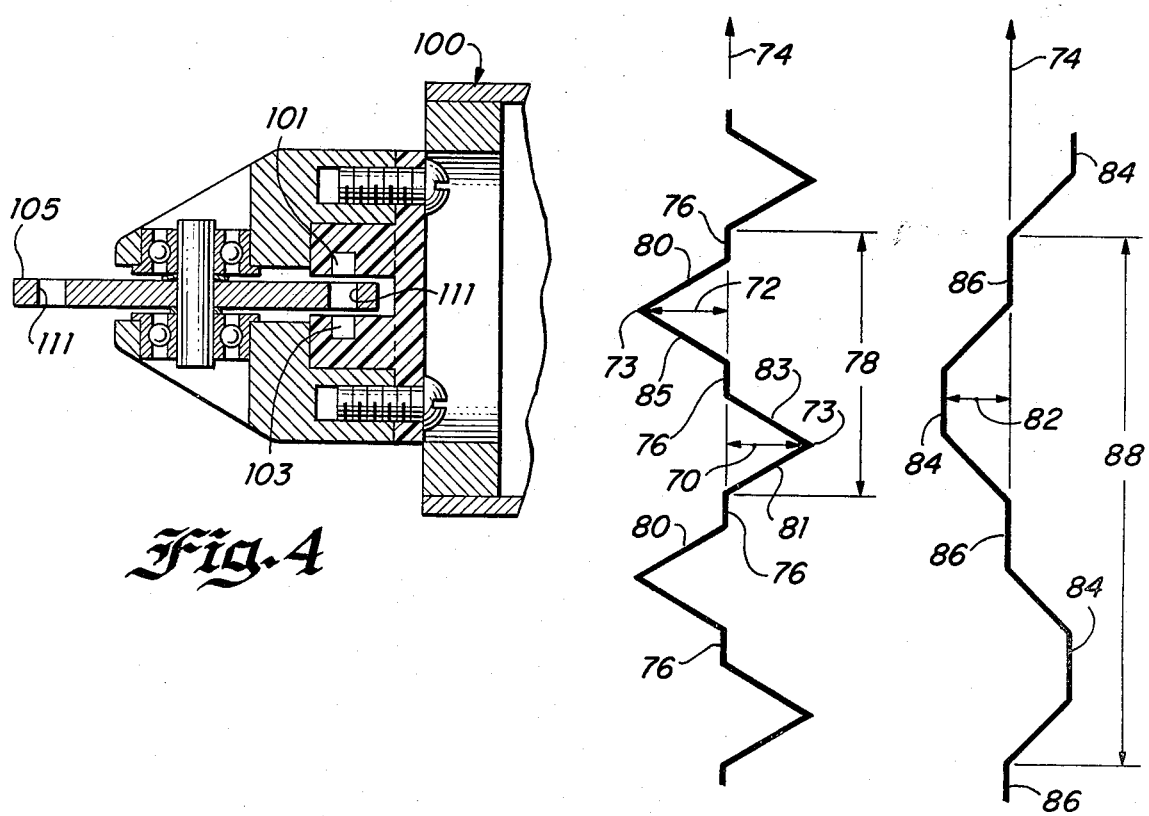

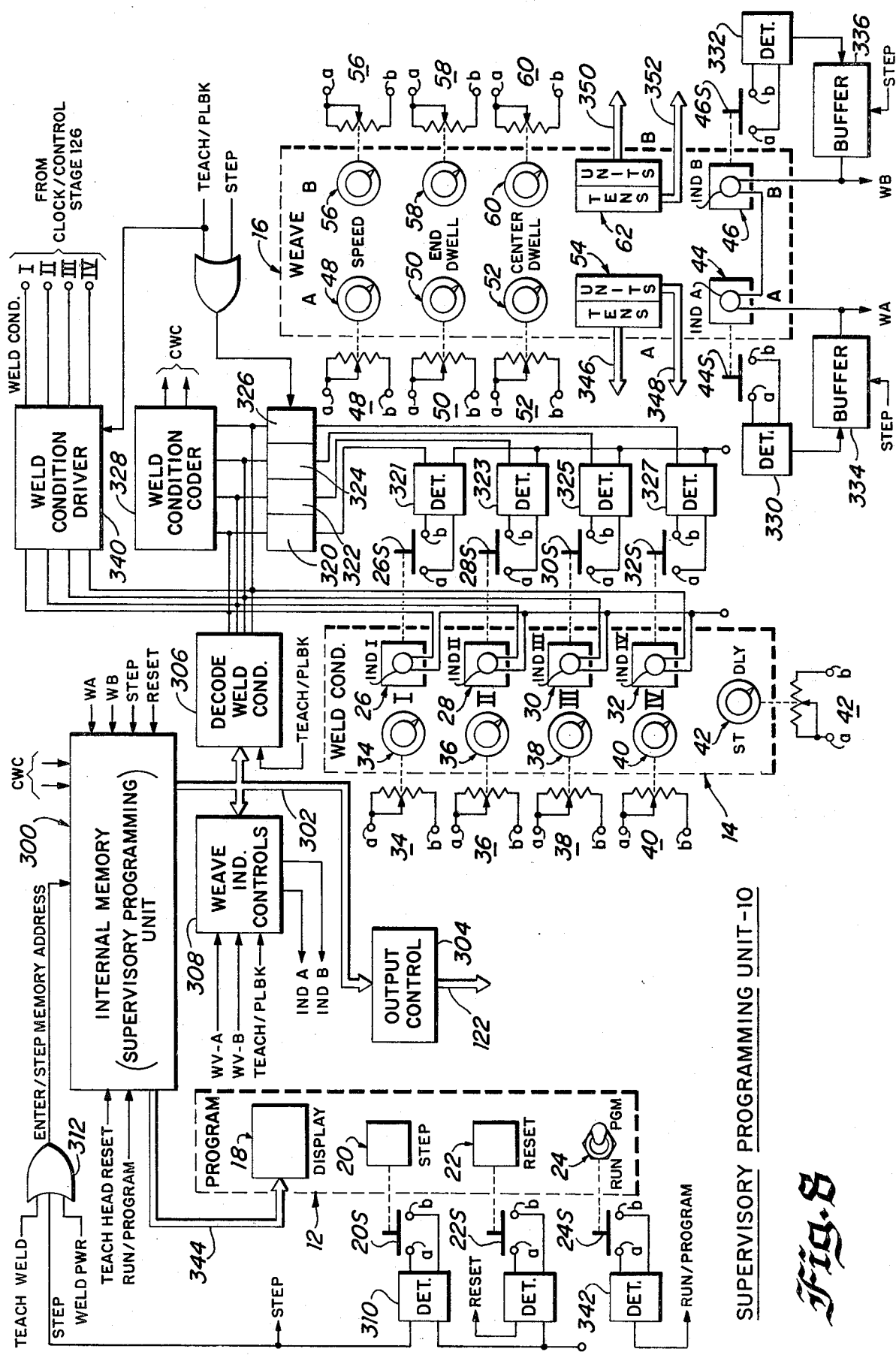
Fig. 8 SUPERVISORY PROGRAMMING UNIT-10

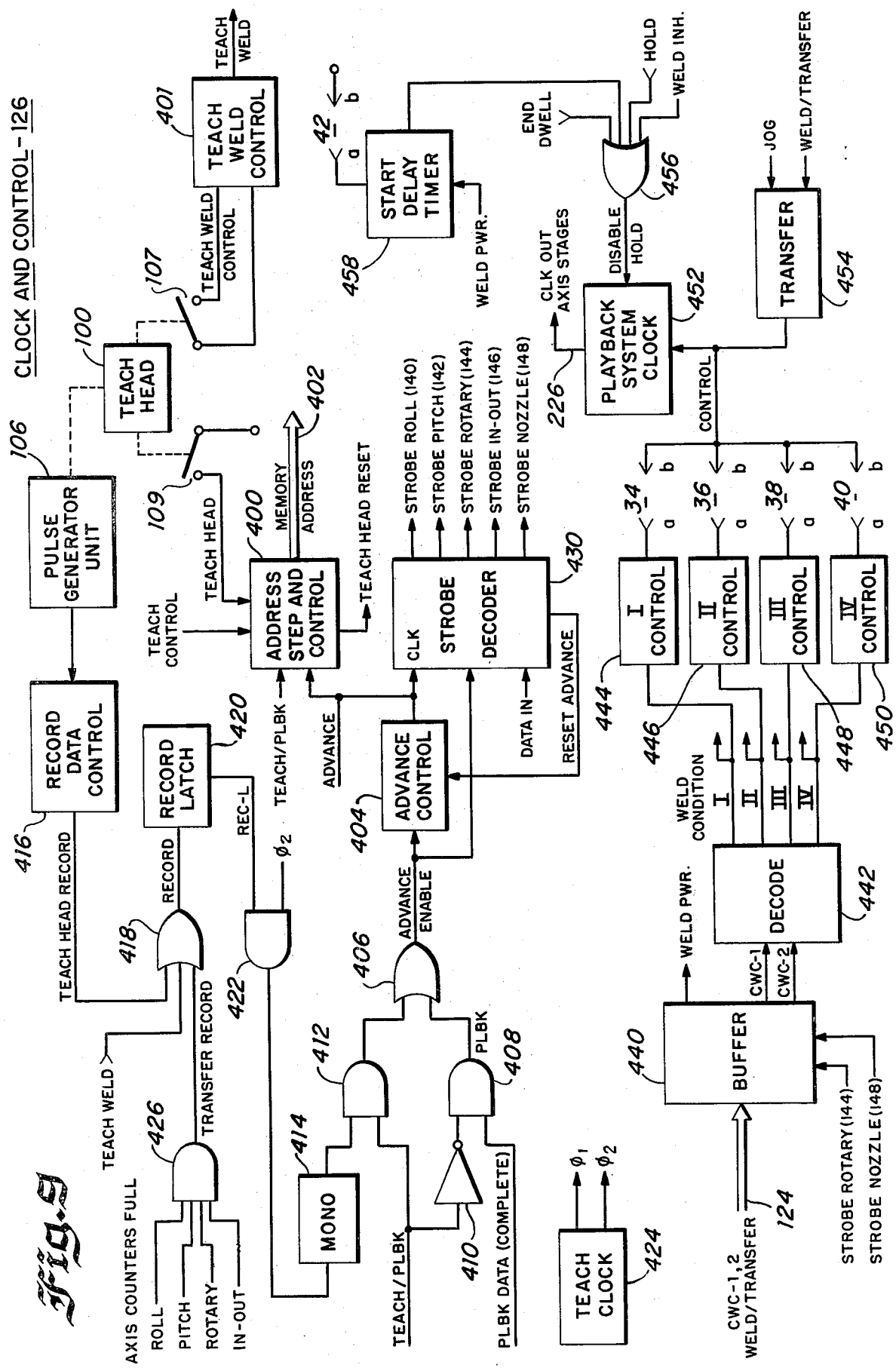

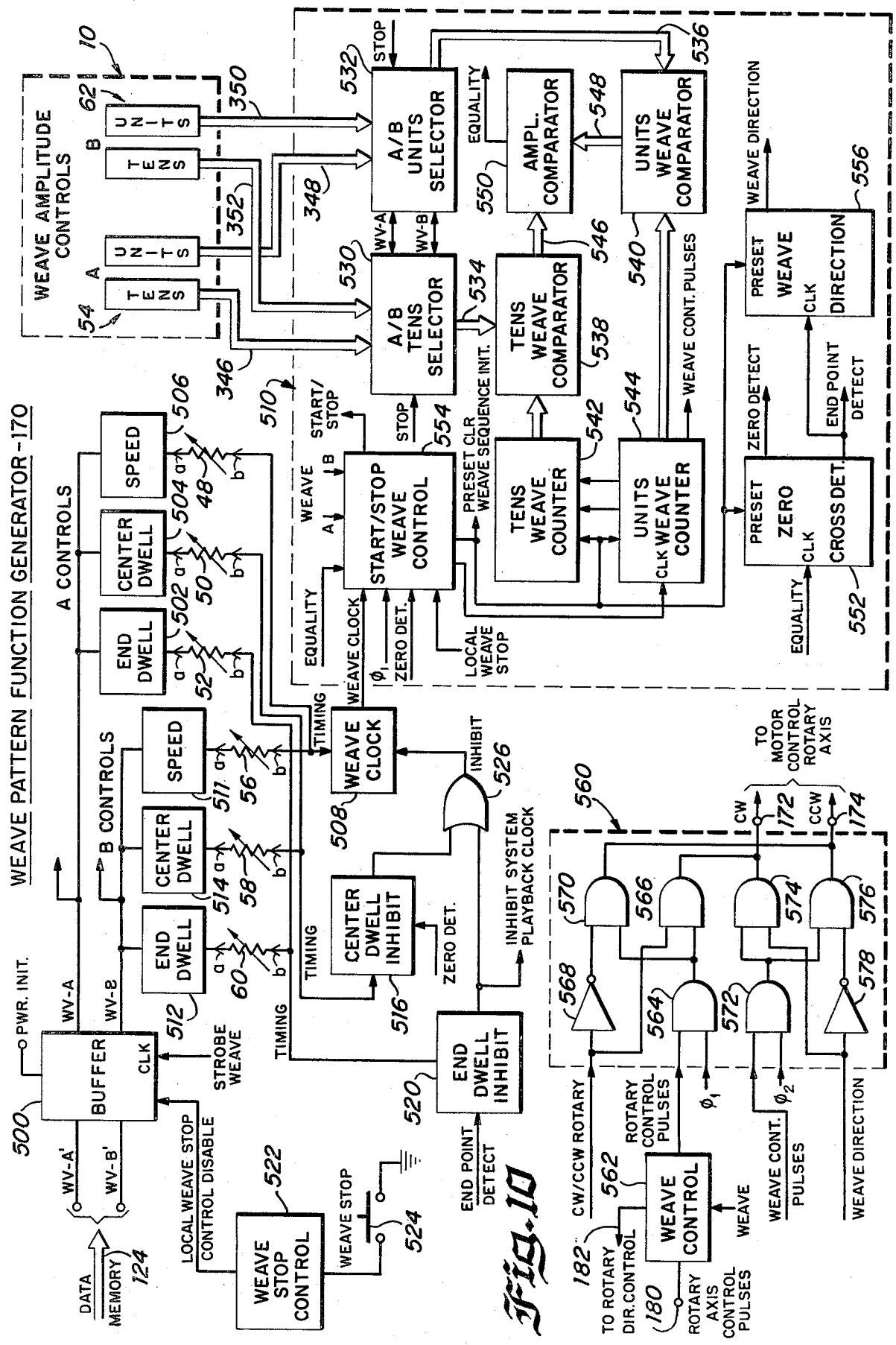

TEACHING ARRANGEMENT FOR PROGRAMMABLE MANIPULATOR

BACKGROUND OF THE INVENTION

A. Field of the Invention

The present invention relates to manipulator apparatus and more particularly to manipulator apparatus including an improved control system wherein a supervisor programs a supervisory control unit of the overall control system in a first teaching phase independent of location and operation of the manipulator apparatus to define and store control parameters representing movement of the manipulator arm independent of work path distance and orientation. An operator/programmer personnel during a second teach phase programs the manipulator apparatus by the recording of positional signals representing the predetermined work paths; the control parameters stored in the supervisory control unit during the initial programming phase being recorded into a main control memory along with the positional work path signals in sequential correspondence. The recorded control parameters and positional signals are read out during a playback cycle as command signals to control movement of the manipulator apparatus along the work paths and to describe movement about the work paths represented by the control parameters stored during the teaching phase.

B. Description of the Prior Art

Programmed manipulator apparatus utilizing various programming techniques have been developed for work operation such as welding, assembling and repetitive work cycles.

One type of programmed manipulator apparatus disclosed in co-pending application Ser. No. 696,903 filed on June 17, 1976 by T. H. Lindbom, now U.S. Pat. No. 4,115,684, provides a lightweight, portable manipulator apparatus which can be readily moved to a given area, clamped in position, programmed by manually moving the end of the manipulator arm over a desired welding path in that area and operated in a playback cycle to automatically perform welding tasks over the work paths. Encoders associated with each axis of the manipulator produce data signals representing movement of the arm in each of the axes as an operator moves the arm over the desired work path. A teach head carried on the end of the arm develops control pulses for each predetermined increment of movement of the arm along the work path; the control pulses being utilized to effect recording of the encoder signals. The recorded signals are then utilized as command signals during playback to move the manipulator apparatus over the programmed path.

Another manipulator arrangement disclosed in U.S. Pat. No. 4,030,617 which issued to A. Richter on June 21, 1977 utilizes a teaching arrangement carried on the head of the manipulator.

A manipulator including an arrangement for aligning randomly oriented parts is disclosed in U.S. Pat. No. 3,885,295 which issued to J. F. Engelberger et al on May 27, 1975. The aligning arrangement moves one of the parts over a predetermined pattern after the part is first moved to a predetermined assembly position.

While the programmed manipulator apparatus of the prior art have in general been satisfactory for their intended purpose, they do not facilitate the recording by supervisory personnel of control parameters such as weld speed, weld conditions, and weaving patterns representative of manipulator arm movement about the taught work paths. Further, it would be desirable to facilitate the programming of such control parameters at a location independent of the work area and at a time prior to the teaching phase by supervisory personnel for each work path in a sequence of work paths defined in a work cycle.

SUMMARY OF THE INVENTION

Accordingly, it is a primary object of the present invention to provide a new and improved manipulator apparatus wherein control parameters that represent manipulator arm movement independent of predetermined work paths are programmed independently of the work location and the manipulator arm during a first programming phase, the work paths are taught in a second teaching phase by an operator who guides the arm over the work paths to automatically record positional signals representing manipulator arm positions along the work paths and the control parameters programmed in the first programming phase in appropriate correspondence in a control memory, and the recorded data is utilized in a playback cycle to automatically move the manipulator arm over the work paths with the control parameters defining manipulator arm parameters and predetermined movement about the work path.

It is another object of the present invention to provide a supervisory control unit and associated manipulator control circuitry for a programmable manipulator apparatus wherein a supervisor/programmer enters control parameter representations into the supervisory control unit for a plurality of work path steps; the control parameter representations being recorded into a main control memory along with positional data representing the work paths during a teaching phase for use as command signals in a playback cycle to control manipulator arm movement in predetermined patterns about the taught work paths.

In accordance with one aspect of the present invention, there is provided a manipulator apparatus having a manipulator arm movable in a plurality of axes and programmable to perform a desired sequence of operations over selected work paths. Basic control parameters relating to manipulator arm movement independent of the path distance and orientation of the work paths are programmed by a supervisor/programmer on the controls of a supervisory control unit. The programmed control parameters represent manipulator arm parameters and manipulator arm movement different than the taught work paths in a subsequent teach phase. Thus, the supervisor/programmer enters the control parameters into the supervisory control unit for each of the work paths designated by steps in accordance with the sequence in which the work paths are to be performed defining a total sequence or work cycle. The control parameters are thus stored with the associated sequence steps or work paths by the supervisory control unit.

An operator/programmer in a teach phase proceeds to guide the manipulator arm over the predetermined work paths. The work paths are taught or programmed by the automatic recording into a main control memory of positional data generated by encoders associated with each of the manipulator axes and representing positions along each of the work paths. During the teach phase, the control parameters stored in the supervisory control unit are automatically recorded into the main control memory for each of the work paths in a predetermined relationship to the recorded positional data points. The recorded signals are utilized as command signals during subsequent playback cycles.

The control parameters in the case of a welding manipulator apparatus includes representations of weld speed, weld conditions and weaving pattern parameters that define manipulator are movement about the work paths. During playback, the control parameter representations are read out of the main control memory to the supervisory control unit and associated control circuitry to generate input signals to a weave pattern function generator and weld control circuitry. The weave pattern function generator modifies the positional command signals for one or more axes to perform the programmed weaving pattern. The individual weld condition and weaving pattern parameters are generated by the supervisory control unit and associated control circuitry during the playback cycle as determined by the control parameter data groups recorded into memory during the teach phase and read out during the playback cycle. The paths are defined along a work surface to be welded.

Between sequential work paths in the overall work cycle or work path sequence, transfer steps corresponding to manipulator arm movement not in contact with the work surface are also taught by the recording of data into the main control memory during the teach phase. The transfer step data is read out of the control memory in playback as command signals to reproduce the taught transfer steps.

The invention both as to its organization and method of operation together with further objects and advantages thereof will best be understood by reference to the following specification taken in connection with the accompanying drawings.

BRIEF DESCRIPTION OF THE DRAWINGS

FIG. 3 is an elevational view of the teach head and weld nozzle of a manipulator arm of the manipulator apparatus of the present invention;

FIG. 4 is an enlarged, fragmentary sectional view of the teach head taken along the line 4—4 of FIG. 3;

FIGS. 6 and 7 are diagrammatic representations of specific weave patterns about programmed work paths programmed and performed by the manipulator apparatus of the present invention;

FIG. 8 is a logic and block diagram schematic representation of the supervisory control unit of FIGS. 1 and 5 of the present invention;

FIG. 9 is a logic and block diagram schematic representation of the clock and control stage of the manipulator control apparatus of FIG. 5; and FIG. 10 is a logic and block diagram schematic representation of the weave pattern function generator stage of the manipulator control apparatus of FIG. 5.

DESCRIPTION OF THE PREFERRED EMBODIMENT

Figure 1:
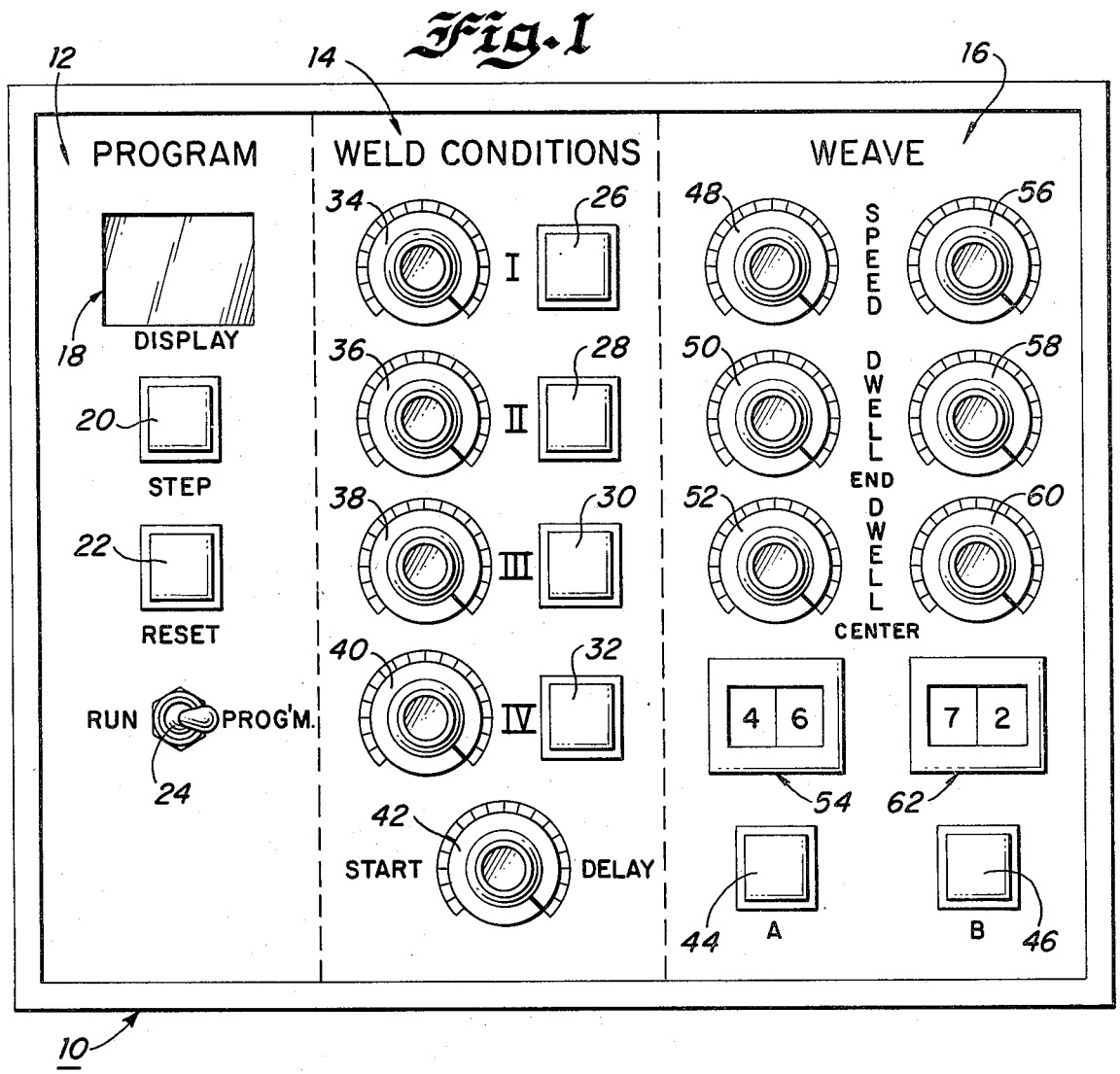
FIG. 1 is a plan view of the supervisory control unit of a manipulator apparatus embodying the features of the present invention.
Figure 2:
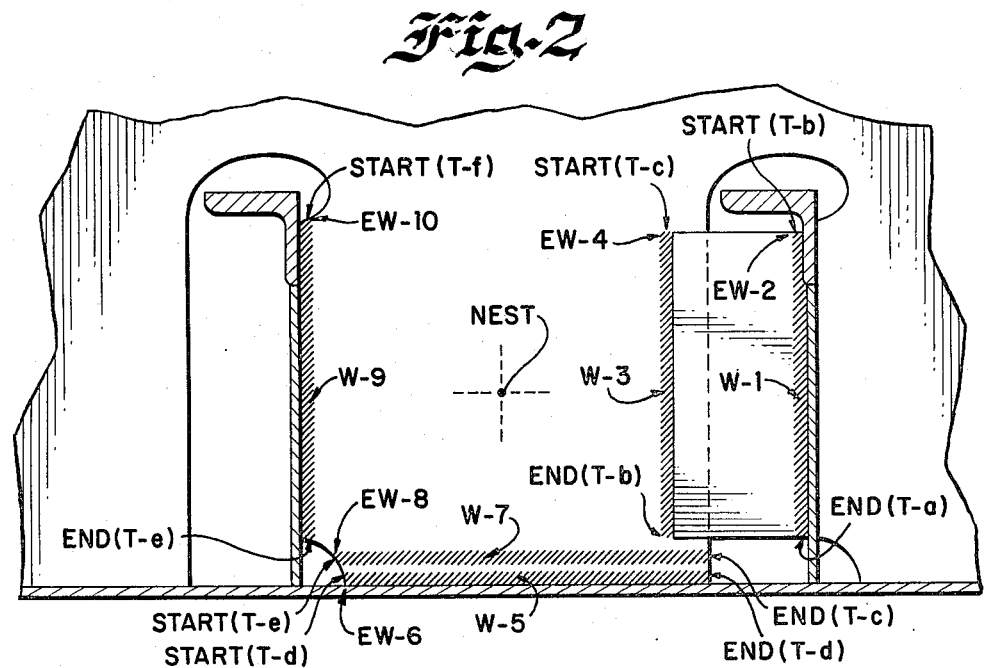
FIG. 2 is a diagrammatic representation of a work cycle comprising a sequence of work paths to be taught and performed by a manipulator apparatus to weld various supports of a ship to the bulk heads.
Figure 5:
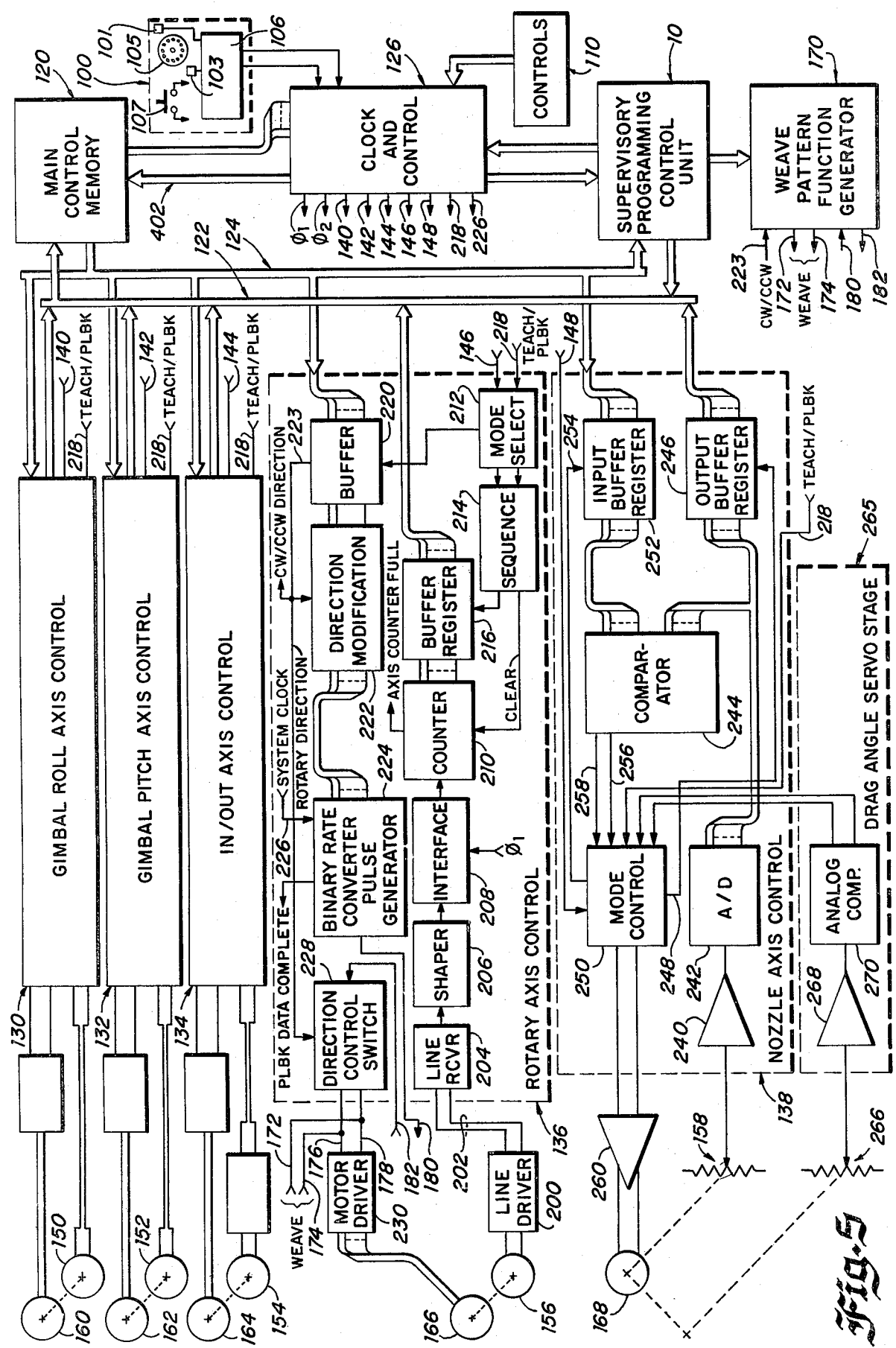
FIG. 5 is a logic and block diagram schematic representation of the manipulator apparatus and the control apparatus of the present invention.

Referring now to the drawings and particularly to FIGS. 1, 2 and 5, the manipulator control apparatus of the present invention is illustrated for use in the control of a programmable manipulator. The work site of the controlled manipulator apparatus in a specific application is the hull of a ship; the manipulator apparatus being programmed to perform a predetermined sequence of weld paths (FIG. 2) between the bulk heads and longitudinal strengthener sections of the ship.

In accordance with important aspects of the present invention, the manipulator control apparatus includes a supervisory programming unit generally referred to at 10, FIG. 1 utilized to program control parameters representing movement of an arm of the manipulator independent of the weld paths. Prior to programming, the weld paths are identified by and assigned numerals or other designations in a sequence by supervisory/programmer personnel; for example, a weld path sequence of five weld path steps; W1, W3, W5, W7 and W9. The supervisor/programmer in a first programming phase inputs control parameter data into the supervisory programming unit 10 by means of various selectors or controllers provided on the supervisory programming unit for each weld path step as determined by the overall work cycle requirements. The control parameter data entered during the first programming phase in a specific embodiment represents welding speed, welding conditions and predetermined weaving patterns; the weaving patterns representing movement about the weld paths having predetermined selectable amplitude deviations and overall shapes. For example, the predetermined weaving pattern may be described as a superpositioning of a repetitive, periodic waveform such as a triangular wave, sinesoid, or the like on a predetermined path.

In a second teaching phase, an operator/programmer with the manipulator apparatus properly positioned at the work site moves the manipulator arm of the manipulator apparatus over the weld paths in the predetermined sequence, identified as steps W-1, 3, 5 7 and 9 for example, to teach the manipulator the welding sequence along the weld paths. Interconnecting transfer steps and end of weave steps between weld paths are also taught. The control apparatus (FIG. 5) of the manipulator automatically records incremental data representative of positions along the weld paths into a control memory by means of a teach head 100 (FIG. 3) carried at one end of the manipulator arm 102. The teach head 100 is moved over the weld paths and controls the recording of data generated by encoders associated with each programmable axis of the manipulator apparatus. The supervisory programming unit 10 under the control of the operator/programmer automatically records the control parameter data into the control memory that was entered in the first programming phase as the operator/programmer teaches the weld paths in the second teaching phase. The control parameter data is recorded in corresponding relationship to the incremental positional data into the main control memory of the manipulator control apparatus.

In a playback cycle, with the welding power on, the incremental positional data and the control parameters recorded during the second teaching phase are read out of the control memory and utilized as command signals by the manipulator control apparatus to move the manipulator arm over the predetermined weld paths. The manipulator arm in the playback cycle welds sequentially along the weld paths as determined by the movement of the manipulator arm during the teaching phase by the operator/programmer and as modified by the control parameters programmed and entered during the programming phase and recorded into the control memory during the teaching phase.

Thus, a supervisor/programmer in a programming phase and at a location independent of the work site determines the appropriate weld paths and their sequence and enters relatively complex control parameters into the supervisory programming unit 10; the control parameters being independent of the weld paths and representing welding conditions and weaving patterns about the weld paths. After the programming phase, an operator/programmer at the work site moves the manipulator over the actual weld paths along the work surface to program the weld paths with the control parameter data as entered by the supervisor/programmer into the supervisory programming unit 10 in the first phase also being recorded in the teach phase.

Thus, the second teaching phase at the work site is less complex and time consuming to facilitate the teaching and set-up that is required at the work site; the work site often times being a cramped and uncomfortable location.

Further, during the second teach phase, the operator/programmer selectively programs transfer steps before the first weld path step, end of weave steps and transfer steps between sequential weld path steps and an end of weave step and a transfer step after the last weld path step with the control apparatus automatically recording data representing the transfer steps; path in space between the weld paths.

The manipulator apparatus to be controlled by the control apparatus of the present invention may be of the general type disclosed in the aforementioned U.S. application Ser. No. 696,903 filed on June 17, 1976, by T. H. Lindbom to which reference may be made for a more detailed discussion of the manipulator apparatus, the control system of the manipulator apparatus, and the associated welding equipment and controls for performing welding. Briefly the manipulator apparatus described in the aforementioned application includes five axes or degrees of freedom arranged in a polar coordinate system to facilitate movement within a working envelope and to minimize any problems caused by interference among the manipulator axes when reaching into corners of the work site. The manipulator apparatus employs a basic gimbal system comprising two gimbal rings. The first ring is pivotally mounted within the manipulator housing by pivot pins for movement about a first axis. The second ring is pivotally mounted within the first ring and arranged to rotate about a second axis perpendicular to the first axis.

In addition to the gimbal roll axis defined by rotation of the first ring and the gimbal pitch axis defined by rotation of the second ring, the manipulator includes an arm 102 carried by the gimbal rings and rotatable in a yaw or rotary axis to define a third axis or degree of freedom. The arm 102 moves by rotation of a central arm support within the second gimbal ring.

The fourth axis or degree of freedom is provided by the extension and retraction (in-out axis) of the manipulator arm. A fifth axis is defined by an articulated weld nozzle 104 or end fitting being rotated about and carried by the manipulator arm 102; the weld nozzle 104 being mounted at the outermost portion of the arm. Thus, the arm is rotatable around its own longitudinal axis and pivotable around two mutually perpendicular axes. The basic gimbal geometry of the manipulator minimizes external loading forces on the drive system.

The gimbal roll, gimbal pitch, arm rotary (yaw) and arm in-out axes are each controlled by a drive motor and suitable drive train mechanism. Further, each of the axes also include a respective encoder device generating signals representative of positional movement in each of the axes. The welding nozzle axis is suitably controlled by an actuator through a mechanical linkage arrangement to the nozzle tip. A position indicating arrangement is also provided to generate data representative of the nozzle position. For example, a potentiometer varied by movement of the welding nozzle is provided with the variations in the resistance of the potentiometer providing a digitized output to the control apparatus after an A/D conversion to represent positional data.

While the control apparatus of the present invention is described in conjunction with the aforementioned specific type of manipulator apparatus, it should be understood that the control apparatus of the present invention may be utilized in the control of various other programmable apparatuses and other types of manipulators. Further, the manipulator axes may include any number of axes and arranged in any orientation system. For example, control of a manipulator as described in U.S. Pat. No. 3,661,051 is also contemplated.

In accordance with important aspects of the present invention and in a preferred embodiment, the supervisory programming unit 10 (FIG. 1) includes a front panel provided with various control and selection arrangements arranged in a program control section 12, a welding condition parameter control section 14 and a weaving pattern parameter control section 16.

The program control section 12 includes a display 18 to indicate the numerical program step to which the supervisory programming unit 10 is conditioned or stepped in the sequence of weld path steps. A push button step control 20 is provided in the program control section 12 to control the advancing of the supervisory program unit 10 and the display 18. The step control 20 also controls the entering of the data selected on the supervisory programming unit 10 into an internal memory. The programming section 12 also includes a push button reset control 22 to return the internal memory of the supervisory programming unit 10 to the first, start step. A program/run mode control 24 is provided to control the operational mode of the supervisory programming unit 10.

The welding condition parameter control section 14 in a specific embodiment includes four push button group welding condition selectors 26, 28, 30 and 32. The group welding condition selectors 26, 28, 30 and 32 are suitably identified by indicia arranged on the front panel of the supervisory programming unit 10. In a preferred embodiment the indicia are the numerals 1, 2, 3 and 4 for the respective group welding condition selectors 26, 28, 30 and 32. In an alternate embodiment, the indicia are the Roman numerals I, II, III and IV. The indicia I, II, III and IV will be utilized hereinafter for discussion purposes to avoid confusion with the numbers of the program steps. Each of the group welding condition control selectors 26, 28, 30 and 32 includes an integral indicator that is actuated when the respective selector is depressed in the programming phase and when the respective group weld condition is active in the teach phase and in the playback mode.

Each of the group welding condition selectors 26, 28, 30 and 32 is associated with a respective rotary parameter selector 34, 36, 38 and 40. Each of the rotary parameter selectors 34, 36, 38 and 40 includes associated calibration indicia. In specific embodiments, the indicia are calibrated in centimeters per minute and represent weld condition parameters including welding speed, welding current, welding voltage, feeding rates of the welding cable or wire, and the speed or movement of the manipulator arm all as will be explained in detail hereinafter.

Thus, when the group I welding condition selector 26 is depressed, the group welding condition parameter represented by the setting of the selector 34 is associated with the particular program address step to which the internal memory of the supervisory programming unit 10 is conditioned. The group welding condition parameters defined by the selector 34 are utilized to control the programmable manipulator and the associated welding apparatus during the playback or work cycle for the particular weld path step selected.

A start delay controller 42 is also provided in the welding condition parameter control section 14 to allow the programming of a predetermined adjustable time interval at the start of the first weld path in the program work cycle. The delay time interval is measured from the time the welding nozzle reaches the beginning of the first weld path step to allow proper sequencing and timing for the start up cycle of the weld process, i.e. proper heat conditions and wire feeding.

Concerning the weaving pattern parameter control section 16 of the supervisory programming unit 10, two (in a specific embodiment) group weaving pattern selectors 44 and 46 are provided representing respective group A and group B weaving patterns. The group weaving pattern selectors 44 and 46 are utilized by the supervisor/programmer during the first programming phase to enter a representation of the weaving pattern parameters into the supervisory programming unit 10 for the corresponding weld path program step of the weld path sequence. Each of the group weaving pattern selectors 44 and 46 is associated with a predetermined number of weaving pattern parameters as selected and defined by parameter selectors calibrated in appropriate parameter units. For example the group A weaving pattern selector 44 is associated with and controls a rotary speed selector 48, a rotary end dwell selector 50, a rotary center dwell selector 52 and a deflection/amplitude display and selector device referred to generally at 54. Similarly, the group B weaving pattern selector 46 is associated with and controls a speed selector 56, an end dwell selector 58, a center dwell selector 60 and a deflection/amplitude display and selector arrangement 62.

Thus in the first programming phase, data representing the group weaving pattern selected by the A or B push button 44 or 46 respectively is recorded into the internal memory of the supervisory programming unit if a weave pattern is to be programmed. If no weaving pattern is required for a particular weld path program step, neither of the group selectors 44 or 46 is selected and the step is recorded in the supervisory programming unit 10 as a no weave step.

During the second phase in which the weld paths are taught and with the mode selector 24 in the run mode, the supervisory programming unit 10 under the control of the operator/programmer automatically records the group welding condition data and the group weaving pattern data for the weld path steps for use in playback into the main control memory; i.e. the group selections entered into the supervisory programming unit 10 during the first programming phase. In playback, the weave pattern parameters corresponding to the group weaving pattern A, B or no weave are executed or implemented as defined by the respective group of weave pattern parameter selectors. For example, if the A group weaving pattern had been selected during the first programming phase and the second teach phase, the parameter selectors 48, 50, 52 and 54 representing the group A weaving pattern parameters in conjunction with the associated control circuitry and weaving function generator (to be described in more detail hereinafter) control the manipulator in playback to perform the corresponding weaving pattern about the corresponding weld path step during playback.

Each of the display and selector controls 54 and 62 in a specific embodiment comprises a two digit rotatable thumb wheel switching arrangement of the type wherein a switch wheel is rotated to display respective numerical indicia and simultaneously control the digital output of data representative of the display indicia in calibrated units. In other specific embodiments, the devices 54 and 62 comprise switches which are actuated by associated push buttons to advance the display and output the selected data.

The group weave pattern parameters determined by the group A or B selectors define a particular periodic weaving pattern. Referring to FIG. 6, the deflection/amplitude parameter selectors 54, 62 for the respective group conditions A, B control the peak amplitude of the deflection 70, 72 in the plus and minus directions respectively (right and left in FIG. 6) of the generally triangular periodic weaving pattern. The deflections 70, 72 of the weaving patterns define the end points 73 of the weaving pattern; i.e. the maximum excursion in weaving pattern units that the weld nozzle tip of the manipulator arm travels in a direction normal to the taught weld path referred to at 74.

It should be understood that while substantially straight line segment weld paths are discussed and illustrated, the weaving pattern is defined about or superimposed on any linear path. Thus, in the case of a curved weld path the deflections 70, 72 are defined along a line perpendicular to the tangent of the weld path. The center dwell parameter selectors 52 (A group), 60 (B group) control or define the number of weave pattern parameter units for which the weld nozzle tip remains or proceeds along the weld path 74 referred to as the center dwell portion 76 of the weaving patterns.

The speed selectors 48 (A group), 56 (B group) control the overall period 78 of the weaving pattern and consequently the slope of each of the transistions 80, 81, 83 and 85 of the weaving pattern between the center dwell portions 76 and the end points 73. The end dwell parameter selectors 50 (A group), 58 (B group) control a predetermined time interval for which the weld nozzle tip pauses or dwells at the end points 73 of the weaving patterns. Thus, at the end points 73, the manipulator movement along the weld path 74 is inhibited as will be explained in detail hereinafter.

The center dwell portions 76, the peak deflections 70 and 72, and the end dwells at the end points 73 are thus independently determined of each other. The weave pattern period 78 includes the center dwell portion 76 and is affected by the weave speed, the amplitude/deflection selectors 54, 62 and the center dwell selectors 52, 60. Further, the selected weld speed also effects the weave period 78, the slope of the transitions 80, 81, 83 and 85 and the length of the center dwell portion 76.

In an alternative embodiment, referring to FIG. 7, the end dwell parameter selectors 50, 58 control the number of weave pattern parameter units for which the weld nozzle tip proceeds in a direction parallel to the weld path 74 and along a line defined by the peak deflection 82. Thus an end dwell portion 84 is defined with no inhibiting of the manipulator weld nozzle tip movement. The weave pattern of FIG. 7 also illustrates another example of center dwell 86, peak deflections 82 and overall period 88 as determined by the various weave pattern parameter selectors. For example, the weave pattern of FIG. 6 may correspond to the Group A selectors and the weave pattern of FIG. 7 to the Group B selectors.

In accordance with an important aspect of the present invention and considering the specific details of the first programming phase performed by the supervisor/programmer, the supervisor/programmer proceeds to enter the appropriate group weld condition and the group weave pattern for each weld path step in a predetermined weld path sequence. In a preferred embodiment, an end of weave step is programmed after every weld path step to accomplish a termination of the weave pattern before further movement. Alternatively, an end of weave step may be programmed only after those weld path steps for which a weave is programmed. In another alternative arrangement, an end of weave step is not programmed after each weld path step if a transfer step is to follow; a transfer step in most work cycles normally follows each weld path step, the weld path steps not being contiguous and connecting. In a specific embodiment, the weave pattern function generator control circuitry of the present invention automatically initiates an end of weave sequence at the end of each weave weld path step.

In accordance with a preferred procedure, the various group weld conditions and group weaving patterns are set-up or adjusted on the front panel selector controls of the supervisory programming unit 10 prior to the entry of the weld path step program. This is accomplished by organizing the weld path steps of the work cycle, for example the five weld paths of FIG. 2 into a sequence. The specific parameters representing the weld conditions and weaving patterns for all steps are organized to associate a particular group weld condition and group weaving pattern with each step. For example, if the five weld path step program requires four different welding condition parameter groups and two different weaving pattern parameter groups, the weld conditions groups are designated I, II, III and IV and the weaving pattern groups are designated A, B.

The four weld condition groups, I, II, III, IV represent four different welding speeds, for example 5, 10, 15 and 17 cm/minute respectively. Similarly, the two weaving pattern parameter groups A, B represent the respective weaving patterns of FIGS. 6 and 7. The supervisor/programmer proceeds to set the respective rotary weld condition selector controls 34, 36, 38 and 40 to the group weld conditions 5, 10, 15 and 17 cm/minute corresponding to groups I, II, III and IV. The supervisor/programmer also sets the respective weaving pattern selector controls 48, 50, 52, 54, 56, 58, 60 and 62 to the corresponding A and B group weave condition parameters.

While the order of arrangement of the group conditions is arbitrary, the preferred procedure is to assign a new group condition in numerical order as each new group condition occurs from step to step in the sequence. The setting up of the supervisory program unit 10 prior to the entry of the group condition step data facilitates and organizes the programming while also ensuring against error. The numerical order assigned to the weld path steps to form a sequence is also arbitrary. However, the assignment of the sequence in the most economical fashion to result in minimum manipulator playback cycle time and maximum efficiency of manipulator movement is contemplated.

Thus, before the supervisor/programmer enters the weld path step data into the supervisory programming unit 10, the following Table I in a specific embodiment is compiled in accordance with the above procedure.

TABLE I

Note: It is not necessary to compile the transfer steps as they are not programmed into the supervisory programming unit in the first programming phase. The transfer steps are listed only for a complete understanding of the overall contemplated manipulator movement in playback. Only the numbered steps are entered into the supervisory programming unit 10 during the programming; the transfer steps being referred to by the lower case alphabet.

| Function-Position FIG. 2 designation | Type and Function of Step | | | | | Supervisory Program Step Designation ( ) not Programed |
|---|---|---|---|---|---|---|
| | Weld | | | | | |
| | Group Cond. | | | End | | |
| | Weld Speed | Weave | Weld Path | of Weave | Transfer | |
| 0- Reset program address | | | | | | 0 |
| T-a Nest to start of path 1 | | | | | a | (a) |
| W-1 Weld Path 1 | I | A | 1 | | | 1* |
| EW-2 End of Weave | | | | 2 | | 2* |
| T-b Transfer to start of path 3 | | | | | b | (b) |
| W-3 Weld Path 3 | I | A | 3 | | | 3* |
| EW-4 End of Weave | | | | 4 | | 4* |
| T-c Transfer to start of path 5 | | | | | c | (c) |
| W-5 Weld path 5 | II | (off) | 5 | | | 5* |
| EW-6 End of Weave | | | | 6 | | 6* |
| T-d Transfer to start of | | | | | d | (d) |

TABLE I-continued

Note: It is not necessary to compile the transfer steps as they are not programmed into the supervisory programming unit in the first programming phase. The transfer steps are listed only for a complete understanding of the overall contemplated manipulator movement in playback. Only the numbered steps are entered into the supervisory programming unit 10 during the programming; the transfer steps being referred to by the lower case alphabet.

| Function-Position FIG. 2 designation | Type and Function of Step | | | | Supervisory Program Step Designation ( ) not Pro-gramed |
|---|---|---|---|---|---|
| | Weld | | | | |
| | Group Cond. | | End | | |
| | Weld Speed | Weave | Weld Path | of Weave | Trans-fer |
| path 7 | | | | | | |
| W-7 Weld path 7 | III | (off) | 7 | | | 7* |
| EW-8 End of Weave | | | | 8 | | 8* |
| T-e Transfer to start of path 9 | | | | | e | (e) |
| W-9 Weld Path 9 | I | A | 9 | | | 9* |
| EW-10 End of Weave | | | | 10 | | 10* |
| T-f Transfer back to Nest | | | | | f | (f) |
| End of Program - Auto Hold | | | | | | 11* |

*STEPS PROGRAMMED DURING SUPERVISORY PROGRAMMING PHASE ON SUPERVISORY PROGRAMMING UNIT 10.

After compilation of the above table, the supervisor/programmer is now ready to program the supervisory programming unit 10.

Alternatively to the above preferred procedure, the supervisor/programmer may examine the required weld condition parameter and weaving pattern parameters as he programs the supervisory programming unit 10 step by step; setting up the parameter selector controls of the supervisory control unit 10 as each step is programmed that requires new group conditions in either the weld condition or weave pattern category. Thus, when programming a step, the weld condition and weave pattern parameters for the step are examined and set up as group condition I and A on the respective associated parameters selector controls.

These two procedures, the preferred and the alternative are discussed in further detail in conjunction with the specific considerations in entering the weld path step data into the supervisory programming unit 10 in the first programming phase.

To begin the programming phase, the supervisor/programmer initializes the supervisory programming unit 10 by positioning the mode selector 24 to the programming position and actuating the reset control 22 to reset the internal memory to the first program address step, step 0. The supervisor/programmer depresses the step control 20 to advance the program to step 1. Now the supervisor/programmer is ready to enter data for each weld path step and advance the program, step by step by the step control 20. Thus at each weld path step as designated in FIG. 2, the supervisor/programmer selects one group weld condition I, II, III or IV and one group weave condition A, B or neither (weave-off) by selection of one of the respective group weld condition selectors 26, 28, 30 or 32 and one of the respective group weave condition selectors 44, or 46. If neither of the group weave condition controls A or B are actuated for a particular program step than a no-weave pattern program step will be recorded. Thus, there are a total of three group weave conditions A, B or no-weave.

For a particular program step, weld path step 1 for example, with the display 18 indicating a numeral 1, the supervisor/programmer selects the appropriate group control conditions IA for example by actuating the group I weld selector 26 and the group A weaving selector 44. The supervisor/programmer then depresses the step control 20. The supervisory programming unit 10 advances the display 18 to step 2 and simultaneously and automatically enters the group control data IA into the internal memory of the supervisory programming unit 10 for use in the second teach phase and in playback. Further, upon depressing the step control 20, any actuated group condition selectors are reset or turned-off along with their respective indicators. The supervisor/programmer now programs and enters an end of weave step, step 2, by again depressing the step control 20 without actuating any of the group condition selectors.

Now the supervisor/programmer examines the criteria determined for the second weld path, step 3. If the group conditions are the same as step 1, IA for example, the supervisor again selects the group condition IA by depressing the selectors 26 and 44. If the group conditions for step 3 are different, the supervisor/programmer examines the front panel for the group conditions if the front panel has been preset to represent all the predetermined variables in accordance with the preferred procedure to represent the various groups conditions for the entire weld path sequence. If this has not previously been done, the supervisor/programmer sets the appropriate selector controls and then enters the group condition data. In either case, the supervisor/programmer actuates the corresponding group condition selectors for weld path step 3. For the specific example in TABLE I, the group conditions are IA the same as step 1. In other specific examples, step 3 might require different group conditions such as II, no weave; IIA; IIB, IB, I, no weave, etc. After actuating the appropriate group condition selectors, the supervisor/programmer depresses the step control 20. Thus, the supervisory programming unit 10 is advanced to step 4 and the selected group condition data is recorded into memory for step 3. Next an end of weave step 4 is recorded by again depressing the step control 20.

The supervisor/programmer continues sequentially over the weld path steps entering the group condition data representative of the parameters selected on the various rotary selectors to define the weld conditions along the weld path steps and the weave pattern conditions to be performed about the weld paths as listed in Table I.

It should be understood that while the specific embodiment illustrated and described includes four weld condition groups and two weave pattern groups and an off or no weave condition, the specific number of weld condition groups and weave pattern groups is determined by the number of conditions required for the particular work cycle to be performed including all the component weld path steps. It should also be understood from the above discussion that the weld conditions and the weave patterns are independently selectable. For example, program step 5 may be entered as a group IA step and step 7 may be entered as a IB step. Similarly, any two program steps in the work cycle may utilize the same group weave pattern and two different group weld conditions, for example IA and IIA.

Thus, at the end of the first programming phase by the supervisor/programmer, the contents of the internal memory of the supervisory programming unit 10 will include the group weld condition data and the group weave pattern data for each weld path step of the work cycle for example as set forth in Table I. To verify the accuracy of the first programming phase, the supervisory programming unit 10 is set to the program mode by moving the mode selector 24 to the run mode. The supervisor/programmer steps through the program by depressing the step control 20 whereupon the display 18 indicates the program step and the indicators of the group condition selectors are actuated corresponding to the recorded data programmed in the programming phase. This verification procedure may also be utilized by the operator/programmer prior to the teach phase with the controls of the manipulator set to the weld power off condition.

Considering now the details of the second teach phase, the manipulator apparatus is positioned in a predetermined relationship with respect to the work surface by appropriate fixturing and the appropriate controls set to the teach mode with welding power off. The operator/programmer guides the manipulator arm over the weld path steps and transfer steps with the supervisory control unit 10 being appropriately interconnected with the manipulator control apparatus. A teach phase of the same general type is described in detail in the aforementioned application Ser. No. 696,903 to which reference may be made for a more detailed discussion. Briefly the teach head 100, FIGS. 3 and 4, is positioned over the weld nozzle end of the manipulator arm 102 with the weld nozzle 104 positioned to a retracted teach position upon depressing a release button 108. With the weld nozzle 104 in the retracted teach position, the teach head 100 interfits over the weld nozzle 104 and is locked thereon for the teaching phase.

A weld control 107 is provided on the manipulator arm 102 at the weld nozzle end to be actuated by the operator/programmer in the teach phase to record a weld sequence. A teach head switch 109 is actuated when the weld nozzle 104 is in the predetermined retracted teach position. The teach head switch 109 is utilized to provide teach mode information to the manipulator control circuitry.

The teaching head 100 includes an incremental position pulse generating unit referred to generally at 106 (FIG. 5) to generate pulses spaced apart by equal weld path increments as the teach head 100 is moved over the weld path steps along the work surface with a wheel 105 of the teach head in rolling engagement with the work surface.

The wheel 105 is provided with a predetermined number of apertures 111 equally spaced about its circumference. A light source 101 and a photosensitive device 103 of the pulse generating unit 106 are disposed on opposite sides of the wheel 105 and aligned with the apertures 111. Thus, as the wheel 105 rotates, the photosensitive device 103 generates signals for each predetermined increment of rotation of the wheel 105 along the work surface. In a specific embodiment, the various drive control and drive train mechanisms of the manipulator axes are de-energized and the operator manually moves the manipulator arm over the desired path. The encoders of the associated manipulator axes produce output signals representing positional movement in the axes and the pulse generating unit 106 of the teach head 100 controls the recording of the signals from the various encoders into the main control memory.

Considering now the specific details of the second teach phase and referring to FIG. 2, the operator/programmer starts the teach recording from a predetermined designated "nest" position defined with respect to the manipulator. The first step that is recorded or taught is a transfer step "a" defining the movement from the nest position to the start of the first weld path step, step 1. The transfer steps for reference purposes as discussed hereinbefore to facilitate discussion will be referred to with lower case letters of the alphabet to distinguish the transfer step 2 from the weld path steps and end of weave steps, one through 10 for example, recorded in the first programming phase. The transfer steps are not recorded in the first programming phase of the supervisory programming unit 10; the transfer steps being recorded in the second teach phase. The manipulator apparatus of the present invention is also capable of recording non-weld, work surface contact steps if required by engaging the teach head 100 to the work surface and teaching a predetermined path without depressing the weld control 107. In FIG. 2, the weld path steps are identified by the symbol W-(step number) and the end of weave step by the symbol EW-(step number). The start and/or end points of the transfer steps are identified by start T-(step letter) or end T-(step letter).

Thus, the first transfer step a from the nest position to the start of the first weld path step one may be referred to as T-a. It should be understood however that no designations of the transfer steps are required to be entered into the main control memory and similarly no step identification data for the program weld path are required to be entered into the main memory. After programming a transfer step from the nest position to the start of the weld path step 1, the operator manually moves the manipulator arm over the weld path step 1 (W-1) while continuously maintaining the teach head wheel 105 in contact with the work surface.

During each of the weld path steps, the operator also holds or continuously actuates the weld control 107 positioned on the teach head 100. The weld control 107 is held actuated only for the weld paths steps and is not depressed when recording the transfer steps including the transfer step from the nest position to the start of the weld path step 1 (W-1 in FIG. 2). Thus, the actuation of the weld control 107 is utilized by the control circuitry of the manipulator apparatus to define weld data and to control the supervisory programming unit 10 to automatically record the group condition data into the main control memory in the second programming phase as entered in the supervisory programming unit in the first programming phase. The supervisory programming unit 10 is also advanced by one program step. Thus, the weld control button 107 is actuated at the start of the weld path step 1 with the teach head in contact with the work surface to advance the supervisory programming unit memory to address step 1. Further, the actuation of the weld control 107 also determines the last recorded point of the first transfer step a (End T-a in FIG. 2). In this regard, and as will be explained in more detail hereinafter, the transfer steps are not recorded under the control of the incremental pulse generating unit 106 of the teach control head 100 but instead are recorded automatically by appropriate monitoring of the control circuitry receiving the individual encoder outputs of the various manipulator axes.

With the weld button 107 continuously engaged, the supervisory programming unit 10 has been advanced to step 1 and displays step 1 for visual verification. Further, the indicators of the selected group condition programmed for step 1 are also actuated. As the operator/programmer moves the teach head over the weld path step 1 and the incremental position data is recorded into memory from the encoders of the five controlled axes, the group condition data discussed hereinabove, for example IA for step 1, is automatically recorded from the internal memory of the supervisory control unit 10 into the main control memory. In the example illustrated in Table I, the group condition data represented by the data IA is recorded along with each data point of the weld path positional incremental data each time the teach head generates a recording pulse. Thus, the group weld condition and group weave pattern selected by the supervisor/programmer during the first phase of each weld path step is automatically recorded along with the positional data for each weld path step in the appropriate sequence and correspondence during the second teach phase. During the second teach phase, all manipulator movement is recorded unless the teach mode controls are deactuated. With the teach head in work surface engagement, the incremental pulse generator unit 106 of the teach head 100 generates control pulses for each predetermined positional incremental change. With the weld control 107 actuated, the movement is recorded as weld path data. For a transfer step with the teach head not in engagement with the work surface, the movement is recorded upon the occurrence of predetermined conditions as determined by the control circuitry.

At the end of the weld path step 1, the operator releases the weld control 107 and then depresses and releases the weld control 107 to record an end of weave step 2 and to advance the supervisory program unit to step 2. Next, a transfer step b is taught and recorded. The transfer step b begins at the end of the weld path step 1 and ends when the operator/programmer contacts the work surface with the teach head at the start point of the weld path 3 (W-3). The last data point recorded as a transfer data point of the transfer step b defines the end of the transfer step b, i.e. END (T-b).

Before the operator/programmer begins to teach the weld path step 3 (and before the start of all other weld paths), the drag angle is inspected and adjusted if necessary to ensure proper welding condition. The drag angle is the angle formed between the weld nozzle tip and the work surface. Proper welding requires that the drag angle be within a predetermined range.

The operator/programmer now proceeds to record the weld path step 3 by actuating the weld control 107 (advancing the supervisory programming unit 10 to step 3) and moving the teach head 100 along the work surface defining the weld path step 3; the teach 100 controlling the recording the positional path data. Along with each incremental data point recorded along the weld path step 3, the appropriate group weld condition and group weaving pattern in the supervisory programming unit for step 3 are also recorded into the main control memory. The operator/programmer proceeds to program the remaining weld path steps 5, 7 and 9 with suitable transfer steps and end of weave steps as listed in Table I. Thus, after the weld path step 9 and the end of weave step 10 are recorded, the operator/programmer teaches and records into memory a transfer step, step f, back to the nest position whereupon the weld button is depressed and released to record the end of program-step 11.

At this point the second teach phase has been completed and the teach head 100 may be removed to prepare the manipulator apparatus for the playback weld cycle. The weld nozzle 104 upon actuation of the release button 108 is returned to the normal extended, predetermined welding position.

The proper recording of the weld path and transfer steps may be verified by actuation of a "jog" control of the control console 110 carried by the manipulator housing. In the jog mode, the weld power is not energized and the manipulator arm operates at a predetermined speed higher than the operating welding speed and quickly runs through the taught program. As the supervisory programming unit 10 runs through the program, the indicators of the group condition selectors and the display provide verification of the proper correspondence between the program steps and the taught steps. If the proper number of steps have not been taught in the second teach phase as compared to the first programming phase, either a hold indicator of the control console 110 will not be actuated when the manipulator arm returns to the nest position or the hold indicator will be actuated before the arm returns to the nest. Further, the manipulator arm in playback is controlled to move at a predetermined speed higher than welding speeds for programmed transfer steps. The control panel 110 also includes the various operational and control switches such as an on/off control, teach control, hold control, start control, and weld power control.

In the replay or welding cycle, the weld power control is actuated and the start button depressed. The manipulator proceeds to perform the welding cycle recorded over the weld path steps and the appropriate transfer steps in accordance with the recorded data in the second teach phase. Further, the display 18 and the indicators of the group condition selectors on the supervisory programming unit 10 provide an indication of the program steps and the group conditions selected. However, it should be realized that in a specific embodiment the supervisory programming unit 10 is not necessary during playback.

Thus, the welds along the weld path steps 1, 3, 5, 7 and 9 are performed. The weld power is turned off and the arm is controlled to move at a higher predetermined transfer speed during the transfer steps. During the welds along the weld paths, the appropriate group conditions are performed over each of the weld path steps in accordance with the specific weld condition and weave pattern group data programmed during the first programming phase and read out of the main control memory during playback. The weld condition parameters and the weaving pattern parameters are determined by the respective parameter selectors. For example, if weld path step 1 was programmed in the first programming phase and recorded in the second teach phase as a Group IA step, the group condition I parameter selector 34 will determine the weld speed condition during the weld path step 1 during the replay program and the group A weave pattern parameter selector controls 48, 50, 52 and 54 will determine the weave pattern during the weld path step 1. Thus, the selector controls of the supervisory programming unit 10 may be modified after the first programming phase and the second teach phase; the group conditions are recorded representing the associated respective parameter selectors to control the group conditions during replay. The specific parameters in centimeters per minute or deflection in centimeters are not recorded. In an alternative embodiment, the specific parameters are recorded into the main control memory during the teach phase. In another embodiment the specific parameters for weld condition and weave patterns are recorded into the internal memory of the supervisory programming unit 10 during the programming phase and into the main control memory during the teach phase.

Turning now to the manipulator apparatus and control circuitry of the present invention, the supervisory programming unit 10 is shown in FIG. 5 interconnected with the manipulator control apparatus. The main control memory stage 120 includes a multiplex data input bus 122 for recording data and a data output bus 124 for the reading out of data in the playback cycle. The memory stage 120 is controlled by a clock and control stage 126. The clock and control stage 126 generates reference clock signals and controls the recording of positional data as determined by the output of the incremental pulse generator unit 106 of the teach head 100.

The clock and control stage 126 includes five STROBE output lines, STROBE PITCH 140, STROBE ROLL 142, STROBE IN/OUT 144, STROBE ROTARY 146 and STROBE NOZZLE 148 for controlling the recording of the positional encoder data received by the respective axis control stages, the gimbal pitch axis control stage 132, gimbal roll axis control stage 130, the in/out axis control stage 134, the rotary axis control stage 136, and the weld nozzle axis control stage 138.

The axis control stages 130 through 136 receive positional data from respective axis encoders, the gimbal roll axis encoder 150, the gimbal pitch axis encoder 152, the in/out axis encoder 154 and the rotary axis encoder 156. The weld nozzle control axis stage 138 receives input data from a potentiometer 158 as discussed hereinabove. Each of the axis control stage 130 through 138 is also interconnected via the data input bus 122 and the data output bus 124 to the main control memory 120 for the respective recording of positional data in the teach phase and the read out of recorded data in playback.

In playback, the recorded data is read out of the memory stage 120 in a multiplex fashion on the output bus 124 to the axis control stages 130 through 138 to control the respective axis drive motors 160 through 168.

The axis control stages 130 through 138 are of the general type as described in detail in the aforementioned application Ser. No. 696,903. The gimbal roll axis, gimbal pitch axis, in-out axis, and rotary axis control stages 130, 132, 134 and 136 respectively are all substantially identical and the specific details of the rotary axis control stage 136 will be briefly considered as exemplary of each of the stages.

The positional encoder signals from the rotary axis encoder 156 are connected to the rotary axis control stage 136 through a line driver stage 200 on an output line pair referred to generally at 202. The encoders are of the type that produce a signal on each of two signal lines for each increment of positional change with the order of generation of the two signals determining the direction of the positional change. The output signals on the pair 202 are connected to a line receiver stage 204 and processed through a shaper stage 206 and an asynchronous interface stage 208 including a first $\phi_1$ clock input generated by the clock control stage 126.

The output of the asynchronous interface stage 208 is connected to the clock input of a counter stage 210 with the counter being advanced or clocked to change the output stage by one data bit position or binary number upon each signal from the encoder 156 signifying an increment of positional change in the axis.

The STROBE ROTARY signal 146 generated by the clock and control stage 126 is connected through a mode select stage 212 and a sequencing stage 214 to a buffer register stage 216. The mode select stage 212 is also controlled by the teach/playback mode control line 218 on which the clock and control stage 126 generates a mode signal TEACH/PLAYBACK to the respective axis control stages. In the teach mode, data is recorded into the main control memory 120 from the buffer register stage 216 under the control of the respective strobe output lines. In the playback mode, data is read out of the memory 120 and into the axis control stages to control movement of the manipulator through the respective axis motors and drive mechanisms.

With the TEACH/PLAYBACK mode control 218 in the teach state, the output of the counter stage 210 is stored in the buffer register 216 until the STROBE ROTARY signal 146 is active indicating that data is to be recorded into memory. As discussed hereinbefore, the STROBE lines are sequentially active in the teach mode when the incremental pulse generator unit 106 of the teach head 100 traverses a predetermined incremental distance along the work surface and thus control the recording of data points. To record transfer step data in the teach mode, an AXIS COUNTER FULL output of the counter stage 210 of the rotary axis stage 136 and respective AXIS COUNTER FULL outputs of the respective counters of the roll axis control stage 130, the pitch axis control stage 132 and the in/out axis control stage 134 are utilized to initiate a strobe sequence to record data by the clock and control stage 126.

Upon the STROBE ROTARY axis control line 146 becoming active, the contents of the buffer register stage 216 is outputted to the data input bus 122 for recording into the main control memory 120. The strobe control lines 140 through 148 are sequentially activated in a predetermined sequence for the multiplex recording of data on the input bus 122 in the teach mode. The STROBE control lines 140 through 148 are also activated in the same sequence in playback for the sequential outputting of data to the respective axis control stages in a similar fashion.

Thus, the counter stage 210 and the buffer register stage 216 accumulate base as inputted from the axis encoder 156 through the various stages 204, 206, 208 between recorded data points as determined by the incremental pulse generating unit 106 of the teach head. The STROBE ROTARY axis control line 146 is also effective through the stages 212, 214 to clear the counter stage 210 after the contents of the buffer register stage 216 have been read out to the data input bus 122. Again the counter stage 210 begins the accumulation of positional and directional encoder data until the next incremental recording pulse is generated In playback, the sequentially outputted data for each axis on the data output bus 124 is stored in a latch or buffer stage 220. The buffer stage 220 drives a direction modification stage 222 controlled by the ROTARY DIRECTION signal 223 as recorded into memory during the teach phase and read out during playback. The data outputted from the direction modification stage 222 is connected to a binary rate converter pulse generator 224 that produces a pulse train of output control pulses at the rotary axis control output line 180 under the control of a playback system clock input signal 226 generated by the clock control stage 126.

The playback system clock signal 226 determines the speed of movement of the manipulator arm in each of the axes in playback and comprises a selected one of a predetermined number of programmed speeds as determined by the group weld conditions, the transfer mode and the jog control as will be explained in more detail hereinafter in connection with the detailed discussion of the clock and control stage 126 of FIG. 9.

The output 180 of the binary rate converter pulse generator 224 is effective to produce a number of pulses during a specified time interval on the basis of the system clock 226 and the positional data recorded in the teach phase and read out during playback to produce movement of the respective manipulator axis. The binary rate converter pulse generator 224 also generates a PLAYBACK DATA COMPLETE signal utilized by the clock and control stage 126 to advance the output of data by the main control memory 120.

The binary rate converter pulse generator output 180 in the case of the rotary axis control stage 136 is connected through a weave pattern function generator stage 170 to produce a modified weave pattern function if a weave pattern has been programmed. If no weave pattern function has been programmed, the output signal 180 of the binary rate converter pulse generator stage 224 is returned unmodified on the two weave output lines 172, 174 in a preferred embodiment or on an output line 182 in an alternative embodiment. The output line 182 is connected to a direction control switch 228 stage of the rotary axis control stage 136. In the case of the axis control stages 130, 132 and 134, the output 180 of the binary rate converter pulse generator stage 224 is directly connected to the input 182 of the direction control switch stage 228.

The directional control switch stage 228 selectively produces the data pulse train from input 182 on one of two direction control lines 176, 178 which are respectively interconnected with the outputs 172, 174 of the weave pattern function generator stage 170. The directional control line as determined from the output data in playback determines the respective direction line 176, 178 on which output control pulses are produced. The direction control lines 176, 178 are connected to a motor driver stage 230 which is effective to control the direction of rotation of the rotary axis motor 166 in correspondence to the pulses generated on the respective direction control lines 176, 178. The motor driver stage 230 thus generates a pulse train; the rotary axis motor 166 along with the axis motors 160, 162 and 164 being of the stepping motor type as described in more detail in the aforementioned application Ser. No. 696,903.

Considering now the nozzle axis control stage 138, the analog positional data from the potentiometer arrangement 158 representing angular nozzle orientation is connected through an amplifier and shaper stage 240 to an analog to digital (A/D) converter stage 242. The analog to digital converter 242 digitizes the nozzle position on a predetermined number of data lines. The digitized output of the A/D converter 242 is connected to a digital comparator stage 244 and also to an output buffer register 246. The output buffer register 246 is effective to output the digitized nozzle position data to the input bus 122 under the control of strobe control line 248 generated by a mode control stage 250. The mode control stage 250 includes the strobe N (nozzle axis) line 148 and the teach/playback mode signal 218 as inputs.

The nozzle axis control stage 138 includes a data input buffer register stage 252 connected to receive data from the output data bus 124 and is controlled by the state of a strobe control line 254 also generated by the mode control stage 250 to input data to one digital input of the digital comparator stage 244 on a predetermined number of data lines.

Thus, the comparator stage 244 in the playback mode digitally compares the output of the A/D converter 242 and the input data from the buffer register 252 to generate a digital output on two control lines 256, 258 dependent on the results of the comparison. The digital outputs 256, 258 are controlled by the mode control stage 250 for use in controlling the nozzle servo motor 168 through a servo amplifier driver stage 260. The nozzle servo motor 168 is operated in a servo control loop in the playback mode; the potentiometer arrangement 158 providing feedback information for the servo loop formed by the A/D converter stage 242, the digital comparator stage 244, and the servo amplifier 260 to move the nozzle axis to follow the output data as read out of memory.

In a specific embodiment, a drag angle servo stage 265 is provided to sense the approximate angular orientation of the weld nozzle tip with respect to the work surface. A potentiometer position sensing arrangement 266 similar to that of the nozzle servo potentiometer arrangement 158 is utilized as an input to an amplifier stage 268 to drive an analog comparator stage 270.

The output of the analog comparator 270 is utilized by the mode control stage 250 to control the output of the servo amplifier 260 to maintain the drag angle as sensed by the arrangement 266 within upper and lower predetermined limits to operate as a window comparator arrangement. Thus, if the sensed drag angle is above or below the predetermined "window" signifying a drag angle above or below the predetermined value, the mode control stage 250 controls the servo amplifier stage lamp 260 to operate the nozzle servo motor 168 in an appropriate direction as indicated by the direction signal output of the analog comparator stage 270 until the drag angle is within the predetermined limits. In an alternative arrangement, the output of the analog comparator stage 270 of the drag angle servo stage 265 may be utilized as an input to the A/D converter 242 and combined with the input from the amplifier stage 240 to control the digital output of the analog digital converter 242 and the input to the digital comparator 244.

The group weld condition and group weaving pattern data recorded into the supervisory programming unit 10 during the first programming phase is recorded into the main control memory 120 during the second teach phase via the data bus 122 in the multiplex format sequence along with the incremental position data for each weld path program step.

In a specific embodiment, the group weld condition and the group weaving pattern data is recorded into and read out from the main control memory 120 at predetermined data positions of the rotary and nozzle sequential strobe positions.

In playback, the group weld condition and weaving pattern data recorded in the teach phase, is read out via the output data bus 124. The weld condition parameters and weaving pattern parameters as selected on the front panel of the supervisory programming unit 10 corresponding to the read out group conditions control the manipulator apparatus. The weld condition parameters and weaving pattern parameters are utilized by the clock and control stage 126, the weave pattern function generator stage 170 and the rotary axis control stage 136 to control the operation of the manipulator in playback to move the manipulator arm in accordance with the programmed group welding conditions and group weaving pattern.

Considering now the operation of the supervisory programming control unit 10 and referring to FIG. 8, the internal memory 300 of the supervisory programming unit is connected with non-destructive memory capabilities. The internal memory 300 includes a read out data bus 302 for the transfer of data to an output control circuit 304 to the main control memory 120 over the data input bus 122 during the second teach phase. The read out data bus 302 and a weld condition decoder stage 306 are effective in the program verification mode, the second teach phase and in playback to control the indicators of the various group selectors on the front panel of the supervisory programming unit 10.

Thus, the selected data is indicated to verify the data being selected and entered in the first programming phase, read out during a program run verification stage after the first programming phase is completed and read out during the second teach phase for verification to the program/operator as the weld cycle is taught. Specifically, each of the group weld condition selectors 26 (I), 28 (II), 30 (III) and 32 (IV) of the weld condition parameter control section 14 and the group weaving pattern selectors 44 (A) and 46 (B) of the weaving pattern control section 16 include a respective indicator device integrally disposed within the push button selectors and referred to respectively as IND I, IND II, IND III, IND IV, IND A and IND B. When the supervisory programming unit 10 is in the run mode for program verification or subsequent use, the four indicators IND I, II, III and IV of the group weld condition selectors are actuated by decoding of the data on output data bus 302 by the weld condition decoder circuit 306 over four indicator control lines connected to the respective indicators IND I, II, III and IV. Further, a weave indication control circuit 308 controls the IND A and IND B indicator devices of the group weave condition selectors over two indicator control lines IND A and IND B from the data bus 302. Thus, after the supervisor/programmer has programmed the supervisory programming unit 10 during the first programming phase and has selected group conditions IA, for example, the respective indicators IND I and IND A are actuated in the run mode by the decoder circuits 306 and 308 from data on the output data bus 302 to verify the correct input programming of the data.

Each of the group selectors 26, 28, 30, 32, 44 and 46 and the step and reset controls 20, 22 include a single pole, push button switch contact arrangement referred to respectively as 26S, 28S, 30S, 32S, 44S, 46S, 20S and 22S. Each of the switches includes respective a and b contact terminals.

The step switch contact terminals a, b of the switch 20S control a detector circuit 310 that produces a STEP output signal upon each actuation of the switch 20S. The STEP output signal is connected to one input of a three input OR logic element 312 along with a TEACH WELD input signal from the weld control 107 on the teach head 100 and a WELD PWR signal from the clock and control stage 126. Upon the occurrence of any one of the three input signals WELD, WELD PWR or STEP, the logic element 312 generates an ENTER/STEP memory address signal to the internal memory 300 of the supervisory programming unit 10 to enter the data selected on the front panel controls of the supervisory programming unit and to advance the memory address by one step.

The reset control 22 by means of the contacts a, b of the associated switch 22S controls a detector circuit 314 to generate a RESET signal also connected to the internal memory 300 the reset the memory address to the initial program state, step 0.

Each of the weld condition selector switches 26S, 28S, 30S, 32S is connected to a respective buffer latch circuit 320, 322, 324 and 326. The outputs of the buffer latch circuits 320, 322, 324 and 326 are connected to a weld condition coder circuit 328 that produces a distinct weld code for each of the respective four weld conditions I, II, III and IV on two coded weld condition output lines referred to generally at CWC and connected to the data input (write) circuitry of the internal memory 300. The outputs of the buffer latch circuits 320, 322, 324 and 326 are respectively connected to operate the weld condition indicators I, II, III and IV. The latches 320, 322, 324 and 326 are reset by the STEP signal. Thus, upon actuation of one of the group weld condition selectors 26, 28, 30 or 32, the respective buffer latch circuit produces an output to be coded as a data input signal over the CWC coded lines. Simultaneously, the output of the respective buffer latch circuit actuates the respective integral indicator of the selector actuated. The indicator remains actuated until the data is entered and the program advanced by operation of the step control 20.

Similarly, each of the weaving pattern group selector switches 44S and 46S is connected through a respective detector circuit 330, 332 and a buffer latch circuit 334, 336 to generate respective WV-A, WV-B weave pattern data signals for entry to the data input circuitry of the internal memory 300. The output of each of the buffer latch circuits 334, 336 is respectively connected to the group weave pattern selector indicators IND A and IND B to actuate the indicators until the buffer latches are reset by the STEP input signal.

In the playback mode, the weld condition input signals I, II, III and IV decoded by the clock and control stage 126 from the main control memory output data bus 124 are utilized by a driver circuit 340 to actuate the respective group weld condition indicator IND I, IND II, IND III or IND IV when the respective weld condition signal line is activated as decoded from the memory output bus 124 of the main control memory 120. Similarly, the weave indicator controls circuit 308 includes the WV-A and WV-B data output signals from the output data bus 124 from the main control memory 120 in playback representing the weave A and weave B data signals as recorded to actuate the indicators A and B as determined by the active state of the WV-A and WV-B data signals. The weave indicator control circuit 308 and the weld condition driver circuit 340 each include the TEACH/PLBK signal from the clock and control stage 126. The switch contacts a, b of the run program switch 24S of the run program control 24 are connected to a detector stage 342 that produces a RUN/PROGRAM signal connected to control the read/write (data output/data input) state of the internal memory 300.

The internal memory 300 includes a display data output bus 344 to control the indicating state of the display 18 in the programming, teach and playback modes of operation. In the preferred embodiment, the program step data in the internal memory 300 is not entered into the main control memory 120.

Each of the weld condition parameter selectors 34, 36, 38 and 40 associated with the respective group weld condition selectors 26, 28, 30 and 32 is operably connected to vary the setting of a potentiometer including respective a and b output terminals. The respective output terminals a, b of each of the potentiometers is connected to the clock and control stage 126 to control the playback system clock as will be described in detail hereinafter in the discussion of the clock and control stage 126.

Similarly, each of the weave pattern selectors, the A group 48, 50 and 52 and the B group 56, 58 and 60 include a respective potentiometer with respective output terminals a, b connected to the weave pattern function generator stage 170 and the weave pattern control circuitry as will be explained in more detail hereinafter. The amplitude/deflection selector, selector 54 for the A group and 62 for the B group, each include a tens and units data output bus interconnected in the weave pattern control circuitry of the weave pattern function generator stage 170; the ten data bus and units data bus of the A group referred to respectively at 346 and 348 and the tens and units data output bus of the B group at 350 and 352. In a specific embodiment, each of the data output buses 346, 348, 350 and 352 include four BCD output lines representing the selected and displayed state of the amplitude selectors 54 and 62.

Referring now to FIG. 9 and the clock and control stage 126, the teach head 100 by means of the teach position switch 109 generates a TEACH/PLYBK signal when the weld nozzle 104 is properly positioned in the retracted teach position. The TEACH/PLYBK signal and the TEACH CONTROL signal from the control panel 110 control the address step and control circuitry 400 to generate a TEACH HEAD RESET signal utilized in the supervisory programming unit 10 to reset the address of the internal memory 300. The address step and control circuitry 400 generates a MEMORY ADDRESS data output bus 402 to control the address state of the main control memory 120. An ADVANCE input signal to the address step and control circuitry 400 advances the MEMORY ADDRESS data bus 402 by one address location or step upon each predetermined change in active state of the ADVANCE signal (pulse signal). The ADVANCE signal (sequence of pulses in the preferred embodiment) is generated by an advance control circuit 404 in response to several control signals to advance the memory 120 to record data in the teach mode. The recording of data is initiated either by the pulse generating unit 106 of the teach head 100 to record data along a weld path on the work surface or by the axis data counters 210 of the axis control stages to record data in a transfer step. In playback, the ADVANCE signal (or sequence) is generated by the advance control circuit 404 upon the completion of the data read out and control of the manipulator drive systems of the various axes.

Specifically, an input to the advance control circuit 404, an ENABLE ADVANCE signal is generated at the output of a two input OR logic element 406. A first input to the logic element 406 controls the ENABLE ADVANCE signal in the playback mode through a two input AND logic element 408 having the PLYBK DATA COMPLETE signal from the binary rate converter pulse generator unit 224 of the rotary axis control stage 136 as a first input and the inverted TEACH/PLYBK signal $\overline{\text{TEACH/PLYBK}}$ as the second input. The inverted TEACH/PLYBK signal is obtained through an inverter element 410 from the TEACH/PLYBK signal.

The second input to the OR logic element 406 controlling the ENABLE ADVANCE signal and representing the teach mode is generated by the output of a two input AND logic element 412. The inputs to the logic element 412 are the TEACH/PLYBK signal and the output of a monostable circuit 414 that generates a predetermined output pulse in response to a recording sequence in the teach mode. The monostable circuit 414 is controlled or triggered by the output of a two input AND logic element 422 including the $\phi_2$ teach clock signal and a RECORD-LATCHED recording sequence signal as inputs. The RECORD-LATCHED signal is generated by three teach record sequence signals: a TEACH HEAD RECORD signal, the TEACH WELD signal, and a TRANSFER RECORD signal.

The TEACH HEAD RECORD signal is generated by a record data control circuit 416 in response to signals from the pulse generator unit 106 of the teach head 100. Upon each predetermined increment of rotation of the pulse wheel 105 of the pulse generator unit 106, a signal is generated to the record data control circuit 416 to produce an output pulse, the TEACH HEAD RECORD signal. The TEACH HEAD RECORD signal is connected to one input of a three input OR logic element 418 to produce a RECORD signal at the output of the logic element 418. The RECORD signal is connected to the input of a record latch circuit 420 to produce the RECORD-LATCHED signal connected to the two input AND logic element 422 that drives the input of the monostable stage 414.

The three input OR logic element 418 also includes the TEACH WELD signal and the TRANSFER RECORD signals as inputs. The TRANSFER RECORD signal is generated at the output of a four input AND logic element 426. The inputs to the logic element 426 are THE AXIS COUNTER FULL signals of the roll axis control stage 130, the pitch axis control stage 132, the rotary axis control stage 136 and the in-out axis control stage 134.

Thus, when any one of the TEACH HEAD RECORD, TEACH WELD or TRANSFER RECORD signals are generated, a RECORD signal and a RECORD LATCHED signal are generated. Upon the occurrence of the next succeeding $\phi_2$ clock output signal, the monostable timing stage 414 is effective when the TEACH/PLYBK signal is in the TEACH mode to generate an ENABLE ADVANCE signal to the advance control circuit 404. The advance control circuit 404 in response to the ENABLE ADVANCE SIGNAL generates an ADVANCE signal sequence to advance the state of the MEMORY ADDRESS bus 402 by one address step for each pulse signal in the ADVANCE signal sequence.

The ADVANCE signal generated by the advance control circuit 404 is also connected to the clock input of a strobe decoder circuit 430. The advance control circuit 404 is effective upon an ENABLE ADVANCE signal to generate a sequence of five ADVANCE pulse signals in a specific embodiment; one advance pulse for each manipulator axis. The five sequential ADVANCE pulse signals are effective to clock the strobe decoder circuit 430 and to advance the address step and control circuit 400. The ENABLE ADVANCE signal is also connected to the data input of the strobe decoder circuit 430. Thus, the strobe decoder circuit 430 generates five sequential output pulses, one output pulse on each of five respective output lines to generate the STROBE ROLL 140, STROBE PITCH 142, STROBE ROTARY 144, STROBE IN-OUT 146 and STROBE NOZZLE 148 signals in a system scan cycle to control the recording of data from the respective output buffer registers of the axis control stages (for example the buffer register 216 of the rotary axis) in a multiplex fashion into the main control memory stage 120 over the data input bus 122. Further, the STROBE signals for the five axes are also effective in the playback mode to control the input of data to the respective axis stages from the memory 120 on the multiplexed output data bus 124.

Upon generation of the fourth sequential strobe output pulse, the strobe decoder circuit 430 generates a RESET ADVANCE signal to the advance control circuit 404 to disable further pulse generation after the fifth ADVANCE pulse signal. Thus, the ADVANCE signal and the STROBE signals control the input (recording) and reading out of the positional data from the five axis control stages of the memory 120 in a multiplex format in a predetermined sequence or sequential scan cycle.

The output data bus 124 of the memory 120 in playback also includes the two coded group weld condition data bits CWC-$1^1$, $2^1$, the WELD/TRANSFER data bit and the group weave data bits WV-A$^1$ and WV-B$^1$ in predetermined address locations in the multiplexed output data as explained hereinbefore. The WELD/TRANSFER data and the coded group weld condition data on CWC-$1^1$ and CWC-$2^1$ are utilized by a buffer circuit 440 to generate the stable output signals CWC-1, CWC-2 and WELD PWR signal. The STROBE ROTARY and STROBE NOZZLE signals are also connected to control the buffer circuit 440.

The WELD PWR signal is utilized for the control of the address state of the internal control memory 300 of the supervisory programming unit 10 and for the control of the welding control apparatus; e.g. welding voltage and wire feed apparatus.

The weld condition lines CWC-1 and CWC-2 are utilized as the inputs to a decoder circuit 442 to generate the four weld condition control group signals WELD COND. I, II, III and IV as discussed hereinbefore in connection with the supervisory programming unit 10. The WELD COND. I, II, III and IV signals are also connected to respective weld condition control circuits 444, 446, 448 and 450 each of which is connected to control a respective one of the potentiometers of the four weld condition parameter selector arrangements 34, 36, 38 and 40; the output of the weld condition control circuits 444, 446, 448 and 450 being respectively connected to the a terminal of the potentiometer 34, 36, 38 and 40. In the supervisory programming unit 10, the b terminals of the weld condition parameter potentiometers 34, 36, 38 and 40 are connected to a CONTROl input of the playback system clock 452. Upon selection of one of the group weld condition parameter potentiometers by the respective weld condition control circuit (for example potentiometer 34 by the WELD COND. I control circuit 444 in response to the decoded WELD COND. I signal in playback) the timing or frequency determination circuitry of the playback system clock 452 is controlled over the CONTROL input by the respective potentiometer setting. The potentiometer setting (34 for example) is selected by the supervisory/programmer in the programming phase and may later be modified by the operator/programmer in the teach phase or in the playback mode.

The CONTROL input of the playback system clock 452 is also connected to the output of a transfer control circuit 454 also including a potentiometer located on the control console 110 or other suitable location for controlling the timing of the playback system clock 452. The transfer control circuit 454 determines the timing or output frequency of the playback system clock 452 in a specific embodiment in both the jog control mode and the transfer mode of operation. The JOG control input from the console 110 and the WELD/TRANSFER mode signal are connected as inputs to the transfer control circuit 454. The playback system clock 452 generates a clock output signal 226 that controls the binary rate converter pulse generator stages of each of the axis control stages.

The playback system clock 452 also includes a DISABLE input to inhibit the generation of clock pulses on the output 226 in response to the output of a four input OR logic element 456. The four inputs to the logic element 456 are an END DWELL signal generated by the weave pattern function generator stage 170, the HOLD control input from the control console 110, the output of a start delay timer control circuit 458 and a WELD INHIBIT signal generated by the welding apparatus upon the occurrence of predetermined sensed conditions. The start delay timer control circuit 458 produces a DISABLE signal to inhibit the playback system clock 452 for a predetermined time interval as determined by the setting of the start delay selector 42 interconnected to the timing control input of the start delay timer control circuit 458. The start delay timer control circuit 458 is also controlled by the WELD PWR signal.

In the playback mode and referring now to FIG. 10, when a weave condition has been recorded into the memory 120 at a particular memory address as determined by the WVA$^1$ and WVB$^2$ data outputs of the data output bus 124, the weave pattern function generator stage 170 initiates a sequence to generate a predetermined weave pattern superimposed on the taught weld path in accordance with the settings of the weave pattern parameter controls of the corresponding group weave pattern programmed in the first programming phase recorded in the second teach phase and read out during playback.

Specifically, the WV-A$^1$ and WV-B$^1$ data inputs are connected to a buffer circuit 500 controlled by the output circuitry that generates the stable group output signals WV-A and WV-B; the WV-A and WV-B outputs remaining active after a respective WV-A$^1$ or WV-B$^1$ data signal has been read out of memory and for as long as the data in successive memory address locations continues to contain the respective WV-A$^1$ or WV-B$^1$ signals. The WV-A signal is connected to control an A group end dwell control circuit 502, an A group center dwell control circuit 504 and an A group speed control circuit 506. The A group control circuits 502, 504 and 506 are respectively connected to the A terminal of the weave pattern parameter selector potentiometers 52, 50 and 48. The b terminal of the weave speed potentiometer 48 of the A group is connected to the timing control input of a weave clock circuit 508 that produces a WEAVE CLOCK output signal; a pulse output to control the weave generator circuit 510 of the weave pattern function generator circuit 170.

Similarly, the WV-B signal is connected to B group weave pattern speed control circuit 511 that is connected through the B group weave speed potentiometer 56 to the timing CONTROL input of the weave clock 508. Thus when a weave group data signal read out of memory, the respective weave speed control circuit 506 or 511 is effective to connect the respective weave speed potentiometer to control the timing of the weave clock 508.

The WV-B signal is also connected to a B group end dwell control circuit 512 and a B group center dwell control circuit 514. The B group center dwell control circuit 514 is connected through the B group center dwell potentiometer 58 to a timing CONTROL input of a center dwell inhibit timing stage 516. Similarly the A group center dwell control circuit 504 is connected through the center dwell potentiometer 50 to the timing CONTROL input of the center dwell inhibit timing stage 516. The end dwell control circuit 502 and the end dwell control circuit 512 are connected through the respective A and B end dwell potentiometers 52 and 60 to the timing CONTROL input of an end dwell inhibit timing stage 520.

Thus, when one of the group weave pattern signals is read out of memory, WV-A or WV-B, the respective weave speed potentiometers 48 or 56 controls the timing of the weave clock 508, the respective center dwell potentiometer 50 or 58 controls the timing of the center dwell inhibit stage 516, and the respective end dwell potentiometer 52 or 60 controls the timing of the end dwell inhibit stage 520. The buffer circuit 500 includes a DISABLE input to disable the WV-A and WV-B signals upon a DISABLE signal being generated by a weave stop control circuit 522 controlled under the control of a weave stop control push button 524.

The end dwell inhibit timing stage 520 upon receiving an END POINT detection signal at its input generates an INHIBIT SYSTEM PLAYBACK CLOCK signal for a predetermined time interval determined by the timing control input of the respective group and dwell potentiometer corresponding to the group weave output data WV-A, WV-B. The INHIBIT SYSTEM PLAYBACK clock signal is connected to one input of a two input OR logic element 526. The output of the logic element 526 is connected to an INHIBIT input of the weave clock circuit 508. The second input of the logic element 526 is connected to the output of the center dwell inhibit timing stage 516. The center dwell inhibit timing stage 516 generates an INHIBIT signal for a predetermined time interval as determined by one of the respective center dwell potentiometers 50, 58 upon receiving a ZERO CROSSING DETECTION signal.

The END POINT DETECTION signal to the end dwell inhibit stage 520 and the ZERO CROSSING DETECTION signal input to the center dwell inhibit stage 516 are generated by the weave generator circuitry 510 at the respective times of the end points and center points or zero crossing points of the weave pattern being generated.

Specifically the weave generator circuitry 510 is controlled by the output buses of the weave amplitude selectors 54 and 62 from the supervisory programming unit 10. The Ten's data bus 346 of the group A amplitude selector 54 and the Ten's data bus 352 of the group B amplitude selector 62 are each connected to a data input of a digital weave amplitude Ten's selector circuit 530. The Unit's data bus 348 of the group A selector 54 and the Unit's data bus 350 of the group B selector 62 are each connected to a data input of a digital weave amplitude Unit's selector circuit 532. Each of the digital selector circuits 530 and 532 includes the WV-A and WV-B weave group data signals as control inputs. Depending upon the state of the WV-A and WV-B signals, the selectors 530 and 532 output the group A or group B Ten's and Unit's data bus information respectively at outputs 534 and 536.

The output 534 of the Ten's selector stage 530 is connected to one input of a digital Ten's weave comparator 538 and the output 536 of the unit selector stage 532 is connected to one input of a digital Unit's weave comparator 540. The second input of the Ten's weave comparator 538 is connected to the data outputs of a Ten's weave counter 542 and the second input of the Unit's weave comparator stage 540 is connected to the data outputs of a Unit's weave counter 544.

Each of the comparators 538 and 540 digitally compares the inputs and produces a respective digital output 546 and 548 indicating the results of the respective comparisons. For example and in a specific embodiment, the comparators 538, 540 generate the output result indication on two digital lines, one indicating a first predetermined input being greater than the second input and the second indicating if the first input is less than the second input. Alternatively, the comparators may produce a single digital output indicating the quality of the two inputs.

In any case, the outputs 546 and 548 of the respective comparators 538 and 540 are each connected to an input of selected peaks amplitude comparator circuit 550 that generates an EQUAL output signal when the inputs 546 and 548 are equal. Thus, the selected peak amplitude comparator 550 produces an equal output pulse signal when the data output states of both the Ten's weave counter 542 and the Unit's weave counter 544 are each respectively equal to the Ten's and Unit's output of the group weave amplitude selectors 54 or 62 depending upon the WV-A and WV-B signals.

Upon the generation of the EQUAL signal, a zero crossing detector circuit 552 responsive to the EQUAL signal at a clock input generates either a ZERO CROSSING DETECTION signal at a first output or an END POINT DETECTION signal at a second output depending upon the previous state of the zero cross detector circuit 552. The previous state of the zero cross detector circuit 552 is preset in a weave initialize sequence and thereafter is alternated between the zero crossing and end point states in accordance with each successive EQUAL signal at the clock input.

The weave initialize sequence is generated by a start/stop weave control circuit 554 generating a WEAVE SEQUENCE INITIALIZE signal. The start/stop weave control circuit 554 includes the weave output clock signal as a first input and the EQUAL signal from the selected peak amplitude comparator 550 as a second input. Further, the group weave condition signals WV-A and WV-B are also connected as inputs to the start/stop weave control stage 544. The ZERO CROSSING DETECTION signal is connected to another input of the start/stop weave control circuit 554.

The WEAVE SEQUENCE INITIALIZE signal, a pulse signal, is generated upon either of the weave group signals WV-A or WV-B becoming active (rising edge of either signal). The WEAVE SEQUENCE INITIALIZE signal is also connected as a reset signal to the Ten's weave counter 542 and the Unit's weave counter 544 and as a preset signal to a weave direction circuit 556. After the counters 542 and 544, the zero crossing detection circuit 552, and the weave direction circuit 556 are initialized upon the detection of a WV-A or WV-B signal, the start-stop weave control stage 554 generates an ENABLE WEAVE CLOCK signal connected to the clock input of the Unit's weave counter 544 that produces clock pulses in accordance with the timing of the weave clock input from the weave clock stage 508. Thus, the Unit's weave counter 544 is clocked upon each output of the ENABLE WEAVE CLOCK signal; the digital data outputs of the counter advancing one binary number for each clock input.

The Unit's weave counter 544 also produces a WEAVE CONTROL PULSE output that is connected to an input of a weave pulse combining stage 560. In accordance with the weave clock pulses, the Unit's weave counter 544 proceeds to advance the digital output state. The Unit's weave counter 544 is connected in cascade to the Ten's weave counter 542. Thus, the Ten's weave counter 542 also proceeds to count the weave clock pulses being clocked once for each ten count of the Unit's weave counter 544. The Unit's weave counter 544 and the Ten's weave counter 542 proceed to count until the respective output states of the counter as determined by the Ten's weave comparator 538 and the Unit's weave comparator 540 are equal to the Ten's and Unit's of the selected peak amplitude or deflection of the respective weave amplitude selector 54 or 62 as determined by the WV-A or WV-B signals.

Upon this equality, the EQUAL signal is generated by the selected peak amplitude comparator 550. This represents an excursion or deflection to the right along portion 81 from the center dwell position 76 of FIG. 6 to the end dwell position 73; the deflection being equal to the selected peak amplitude deflection 70. Since the zero cross detection circuit 552 is initially preset to the zero detection state and this represents the first EQUAL signal generated in the weave pattern generation sequence, the END POINT DETECTION signal is generated by the zero cross detection circuit 552. The END POINT DETECTION signal is connected to the clock input of the weave direction stage 556 which is preset in a specific embodiment to the clockwise or plus weave direction state. At this point, the state of the WEAVE DIRECTION signal is changed to represent that of the counterclockwise state.

The EQUAL signal is also effective to cause the start/stop weave control circuit 554 to generate a WEAVE SEQUENCE INITIALIZE signal to reset the Ten's weave counter 542 and the Unit's weave counter 544 to the zero output state whereupon they again begin counting toward the selected peak amplitude on the data buses 534 and 536. As the counters proceed to count and advance in output state in the counterclockwise or minus sense, this represents an excursion or deflection to the left along portion 83 back toward the center or zero crossing point of the weld path 74. If an end dwell has been selected on the respective end dwell potentiometer 52 or 60 in accordance with the weave pattern selected, the end dwell inhibit circuit 520 upon receiving the END POINT DETECTION signal from the zero crossing detector 552 produces an INHIBIT SYSTEM PLAYBACK CLOCK signal effective to inhibit operation of both the system playback clock 452 and the weave clock 508 through the logic element 526. Thus, the tip of the weld nozzle 104 dwells at the end point 73 for a predetermined interval of time depending upon the setting of the respective group end dwell potentiometer.

Continuing in the weave pattern generator sequence when the data output of the counters 542 and 544 again reaches the selected peak amplitude state, the EQUAL signal is generated and the zero cross detector is now changed in state to produce a ZERO CROSSING DETECTION signal indicating the center dwell position 76 in FIG. 6. Again the start/stop weave control stage 554 generates a WEAVE SEQUENCE INITIALIZE signal to reset the counters 542 and 544 to again begin counting.

At this point, if a center dwell inhibit has been programmed, the center dwell inhibit stage 516 by means of the ZERO CROSSING DETECTION input signal inhibits the weave clock 508 for a predetermined time interval dependent upon the center dwell selector setting of the group weave pattern programmed. Thus, the weave clock 508 is inhibited but the playback system clock 452 continues; the manipulator weld nozzle tip continuing at programmed weld speed slong the center dwell portion 76 of the weld path 74.

After the time out of the center dwell inhibit stage 516, the weave clock 508 is again enabled, the Unit's weave counter 544 is clocked and the counters 542 and 544 proceed to count. Now, the portion 85 of FIG. 6 is described continuing in the counterclockwise or minus direction state to the left in FIG. 6 with the WEAVE DIRECTION signal being unchanged as the weave pattern proceeds through the center dwell portion 76 to the end point 73.

Again upon the counters 542, 544 reaching the state of equality with the selected peak amplitude settings, the EQUAL signal changes the state of the zero crossing detector 552 from the previous zero crossing state to the end point state. Thus, the END POINT DETECTION signal is active to clock the state of the weave direction circuit 556 to the clockwise or plus direction (to the right in FIG. 6). Now the counters 542 and 544 are reset to zero and again beging counting. However, this time the weave pattern described is along the portion 80 in the clockwise direction orientated from the end point 73 at peak amplitude deflection back toward the center dwell portion 76. Again upon the EQUAL signal being generated as the counters 542 and 544 reach the peak amplitude count, the zero cross detector 552 is changed in state from the previous end point state to generate a ZERO CROSSING DETECTION signal. Again the center dwell inhibit circuit 516 is activated (if programmed) to control operation along the center dwell portion 76.

The above procedure continues for as long as the WV-A or WV-B signal continues to be outputted from the output data bus 124. Upon each occurrence of the EQUAL signal, the zero crossing detector 552 changes the output state, alternatively from ZERO CROSSING DETECTION to END POINT DETECTION states. The weave direction circuit 566 changes state upon each occurrence of the END POINT DETECTION signal; i.e. at every other EQUAL signal.

Upon the end of a programmed weld path with a weave sequence, the WV-A or WV-B signal will no longer appear on the data output bus 124 whereupon a stop weave sequence will take place. This is accomplished by the start/stop weave control circuit 554 discontinuing the weave pattern generation sequence at the next occurrence of the ZERO CROSSING DETECTION signal after the falling edge of the WV-A or WV-B signal at the output of the buffer circuit 500. The first data output address at which the selected weave group WV-A or WV-B is no longer recorded indicates the first data address location of an end of weave step recorded or taught after a weld path step. Thus, the stop weave sequence of the weave pattern encompassing the time from the falling edge of the WV-A or WV-B signal to the time the next ZERO CROSSING DETECTION signal is generated occurs during the end of weave step time. The time interval of an end of weave step is approximately equal to the time for the PLAYBACK DATA COMPLETE signal to be generated comprising a predetermined number of periods of the playback system clock.

The weave pulse combining stage 560 is effective to combine the WEAVE CONTROL PULSE signal, the WEAVE DIRECTION signal, the ROTARY AXIS CONTROL PULSE signal 180 and the ROTARY AXIS DIRECTION signal to superimpose the predetermined weaving patterns along the weld path defined by the rotary axis control stage 136. The weave pulse combining stage 560 by use of the teach clock timing signals $\phi_1$ and $\phi_2$ generates a pulse train of control pulses at a first clockwise or plus direction output 172 or at a second counterclockwise or minus direction output 124; the rotary axis control pulses being generated under the control of the $\phi_1$ clock phase and the weave pattern control pulses being generated under the control of the $\phi_2$ clock phase to ensure proper spacing between the pulses. The outputs 172, 174 are connected to the motor control driver stage 230 of the rotary axis. The predetermined weave pattern is defined by the end dwell, center dwell, weave speed, and amplitude deflection settings as discussed hereinbefore and represented by the timing and number of pulses generated as the WEAVE CONTROL PULSE signal line.

Considering the specific details of the weave pulse modification combining circuit 560, the ROTARY AXIS CONTROL PULSE signal 180 from the output of the binary rate converter pulse generator circuit 224 of the rotary axis control stage 136 is connected through a weave control circuit 562 to one input of a two input AND logic element 564.

The weave control circuit 562 is illustrative of an alternate embodiment wherein the rotary axis control pulse output line 180 is returned through output 182 in unmodified form back to the direction control circuit 228 of the rotary axis control stage 136 when a no-weave pattern is programmed. In the preferred embodiment, the weave control circuit 562 is not required and the rotary axis control pulses from the binary rate converter pulse generator circuit 224 are processed through the weave pulse combining circuit 560 to the outputs 172, 174 whether or not a weave pattern has been programmed.

The second input to the logic element 564 is the $\phi_1$ teach clock output utilized for sequencing the rotary control pulses to be alternatingly be interleaved with the weave control pulses; thus rotary control pulses from the binary rate converter pulse generator 224 and the weave control pulses generated by the units weave counter 544 of the weave generator circuit 510 alway occur at predetermined times each cycle of the teach clock 424 and never simultaneously or close enough in time to eliminate or alter the contribution of either pulse.

The output of the logic element 564 is connected to one input of a two input AND logic element 566 with the second input being the DIRECTION (clockwise/counterclockwise) ROTARY signal from the rotary axis control stage 136. The output of logic element 566 is the clockwise (plus) output 172 to the motor control driver circuit 230. The (clockwise/counterclockwise) ROTARY DIRECTION signal is also connected through an inverter element 568 to one input of a two input AND logic element 570 with the second input of the logic element 570 being the output of the logic element 564. The output of logic element 570 is connected to the counterclockwise (minus) output 176.

The WEAVE CONTROL PULSE signal of the Unit's weave counter 544 is connected to one input of a two input AND logic element 572 with the second input being the $\phi_2$ clock input of the teach clock 424. The output of the logic element 572 is connected to one input of a two input AND logic element 574 with the second input being the WEAVE DIRECTION signal of the weave direction stage 556. The output of the logic element 574 is connected to the clockwise (plus) output 172. The output of logic element 572 is also connected to one input of a two input AND logic element 576 with the second input being the output of an inverter 528 connected to the WEAVE DIRECTION signal. The output of logic element 576 is connected to the counterclockwise output 174.

In a preferred embodiment, the supervisory programming unit 10 initiates an autohold sequence after the internal memory 300 is advanced to the last programmed address step, step 11 in the table as programmed in the first programming phase and recorded during the second teach phase. This is accomplished by recording the highest program step number (11 for example) in the memory 300. Thus, in playback, the highest program number is read out of memory at each program step and compared with the present program step number. When equality is found, the last highest numbered programmed step (End of Program step 11) is currently being read out of the memory 300. This equality is utilized to generate an Auto-hold mode upon the occurrence of a suitable timing signal such as the PLAYBACK DATA COMPLETE signal. After the equality and the timing signal are generated, the manipulator apparatus is placed in the Hold or standby mode of operation.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator having an arm movable in a plurality of controllable axes,
   means for generating signals during a teach phase representing positions described by one end of said arm along one or more work paths, said work paths each comprising a predetermined element in a work path sequence to define an overall work cycle;
   supervisory programming control means independent of said path signal generating means for programming control parameters independently of and prior to said teach phase in a supervisory programming phase, said control parameters representing movement and control of said arm independent of said work path signals, each of said control parameters being associated with one or more of said work paths in said sequence, said supervisory control parameter programming means comprising means for selecting and sequentially storing said control parameters during said supervisory programming phase and prior to said teach phase in a format identified by said work path sequence; and
   manipulator main memory means for storing said generated work path signals and said programmed control parameters in a predetermined relationship for use in generating command signals in a replay mode, said generated work path signals being stored in a predetermined relationship representing said work path sequence, a plurality of work path signals and at least one control parameter being associated with each of said work paths,
   said supervisory control parameter programming means further comprising means for entering said selected and stored control parameters corresponding to each of said work paths into said replay storing means during said teach phase as each respective work path is being taught.

2. The programmable manipulator of claim 1 wherein said control parameters represent predetermined movements in said controllable axes to be performed in a replay cycle about the work path described in said teach cycle and represented by said generated work path signals.

3. The programmable manipulator of claim 1 wherein said manipulator arm comprises a work head carried by said arm at one end of said arm, said work path signal generating means comprising encoder means associated with each of said controllable axes for generating positional signals representative of positional change in each of said axes, means responsive to said positional encoder signals for generating said work path signals, and teach means positioned on said work head of said manipulator arm and in contact with a work surface over each of said work paths for controlling said replay storing means to record said work path signals corresponding to predetermined incremental distances along each of said work paths.

4. The programmable manipulator of claim 3 further comprising means independent of said teach controlling means and responsive to said positional encoder signals for controlling the recording of transfer path signals representing movement of said work head when said teach controlling means is not in contact with said workpiece surface.

5. The programmable manipulator of claim 3 wherein said teach controlling means further comprises work path step means for controlling the recording during said teach phase of said programmed control parameters into said manipulator main memory means.

6. The programmable manipulator of claim 5 wherein said work path step controlling means comprises manually actuable means operable by an operator/programmer during said teach phase, said manually actuable means upon each operation controlling said control parameter programming means to output the programmed control parameter of the next successive work path.

7. The programmable manipulator of claim 1 wherein said control parameters represent groups of predetermined path parameters, said predetermined path parameters representative of positional changes and movement with respect to said work paths to define a predetermined pattern about said work paths in accordance with said path parameters.

8. The programmable manipulator of claim 7 further comprising means responsive to said stored work path signals and control parameters for generating command signals for moving said manipulator arm over said work paths in said replay mode.

9. The programmable manipulator of claim 8 further comprising means responsive to said supervisory control parameter programming means during said replay mode for generating work path modification signals to describe said predetermined pattern about said work paths.

10. The programmable manipulator of claim 9 further comprising means for combining said work path modification signals with said command signals in a predetermined manner and for one or more predetermined axes to move said manipulator arm with respect to and along said work path in accordance with said stored control parameters to describe said predetermined pattern.

11. The programmable manipulator of claim 10 wherein said command signals and said work path modification signals are generated in a pulse train format and wherein said combining means combines said work path modification signals and said command signals in a time division manner so as to interleave said pulse train formats of said work path modification signals and said command signals.

12. The programmable manipulator of claim 9 wherein said supervisory control parameter programming means further comprises means responsive to said stored control parameters for generating predetermined path parameters.

13. The programmable manipulator of claim 9 wherein said work path modification signal means comprises means for generating predetermined, selected path parameters representative of positional changes and movement with respect to said work path in accordance with the particular stored control parameter in said manipulator main memory during said replay mode.

14. The programmable manipulator of claim 13 wherein said work paths are substantially linear paths and said work path modification signals represent movement of said manipulator arm back and forth across said work paths.

15. The programmable manipulator of claim 14 wherein said work path modification signals also represent the relative speed of movement along said work path.

16. The programmable manipulator of claim 14 wherein said work path modification signals represent a path about said work path defining predetermined geometric excursions with respect to said linear work paths.

17. The programmable manipulator of claim 14 wherein said path parameter generating means comprises:
   deflection means for defining the peak amplitude of the work path modification normal to said work path and representing the end point of said predetermined pattern;
   end dwell means for defining a predetermined end dwell time interval during which the manipulator arm movement is inhibited at the end point of said predetermined pattern; and
   center dwell means for defining the extent of said predetermined pattern along said work path.

18. The programmable manipulator of claim 17 wherein said path parameter generating means further comprises means for defining the velocity of said manipulator arm along said work path and the relative velocity at which said manipulator arm moves in a direction out of said substantially linear work path to said peak amplitude modification.

19. The programmable manipulator of claim 18 wherein said relative velocity defining means defines the slope of said predetermined pattern and the manipulator arm modification with respect to said work path.

20. The programmable manipulator of claim 14 wherein said path parameter generating means comprises means for modifying said moving means to control the relative speed of said manipulator arm along said work path.

21. The programmable manipulator of claim 13 wherein said work paths are linear paths and said predetermined pattern is a periodic wave, said work path modification signals superimposing said periodic wave on said linear paths.

22. The programmable manipulator of claim 1 further comprising replay means responsive to said replay storing means for controlling the movement of said arm along said taught work paths, said control parameters representing groups of predetermined pattern parameters representative of a periodic pattern, said replay arm controlling means comprising means responsive to said stored control parameters and said stored work path signals for superimposing said repetitive periodic patterns on said taught work paths in accordance with said predetermined pattern parameters.

23. The programmable manipulator of claim 22 wherein said control parameter programming means comprises means for selecting said predetermined pattern path parameters.

24. A method of programming a programmable manipulator having an arm movable in a plurality of axes and encoder means for each of said axes operative to develop position signals representing movement of said arm in each of said axes, the method comprising the steps of:
   programming a predetermined number of work path control parameters for one or more work paths along a work surface, each of said work paths being associated with the particular programmed work path control parameters, said work path control parameters being independent of the work path distance and orientation;
   teaching said manipulator the work paths to be performed in a sequential manner by leading said manipulator arm over said work paths with one end of said manipulator arm being in contact with the work surface along each of said work paths;
   recording a series of position signals during said teaching step representing data points along said work paths in a sequence corresponding to the programmed work path sequence; and
   recording said programmed work path control parameters for each of said associated work paths as each respective work path is taught during said teaching step and as the position signals are recorded representing the corresponding data points along said particular work paths for use in a reply cycle,
   said programming step comprising the steps of:
   selecting one or more control parameters for each work path; and
   storing said selected control parameters for each work path.

25. A method of programming a programmable manipulator as recited in claim 24 further comprising the step of:
   utilizing said stored work path control parameters and work path data signals in the replay cycle to control movement of said manipulator arm along said work paths in a predetermined sequence and to control movement of said manipulator arm along and about said work paths in accordance with said work path control parameters.

26. A method of programming a programmable manipulator as recited in claim 25 wherein a predetermined number of work path control parameters are represented by a mode control group, each of said work paths being associated with a mode control group.

27. A method of programming a programmable manipulator as recited in claim 25 wherein the control parameters programmed for each work path comprises a work path control parameter from a first group and a work path control parameter from a second group.

28. A method of programming a programmable manipulator as recited in claim 27 wherein said first group represents a category of relative velocity parameters along said work path.

29. A method of programming a programmable manipulator as recited in claim 28 wherein said second group represents a category of movement about said work path to define a predetermined pattern about said work path.

30. A method of programming a programmable manipulator as recited in claim 29 wherein said second category includes an amplitude parameter representing the peak modification movement normal to said work path, and end dwell parameter representing a time duration during which movement of said manipulator arm is inhibited at said peak modification position, a center dwell parameter representative of a predetermined interval of movement along said work path, and a speed parameter representative of the relative speed of repetition of said amplitude, end dwell and center dwell parameters.

31. A method of programming a programmable manipulator as recited in claim 24 further comprising the steps of:
teaching transfer paths to be performed between said taught work paths; and
recording position signals representing data points along said transfer paths.

32. A supervisory programming unit for use in conjunction with a programmable manipulator movable in a plurality of axes and including signal producing apparatus and teach control apparatus to generate data signals representative of work path distance, the manipulator being programmed during a teaching phase over a plurality of work paths in a predetermined work path sequence by engagement of the end of said manipulator along the work path, said data signals being generated at predetermined incremental distances along said work path, said supervisory programming unit comprising:
means for selecting control parameters representing movement and control of the manipulator independent of work path distance, said control parameter selecting means comprising manually actuable control parameter means operable by a supervisory/programmer during an initial programming phase prior to said teaching phase;
means for associating said selected control parameters with predetermined work paths in the predetermined work path sequence during said initial programming phase, said work path associating means comprising means for displaying an element of a sequence associated with each of said work paths in the predetermined work path sequence;
means for storing said selected control parameters and associated work path sequence elements in a predetermined addressable format, said storing means comprising means responsive to said work path associating means and said control parameter selecting means for storing representations of said selected control parameters and said displayed work path sequence element; and
means responsive to said teach control apparatus during said teaching phase and for controlling the read out of said stored control parameters and associated work path sequence elements as said respective work paths are programmed during said teaching phase.

33. The supervisory programming unit of claim 32 wherein said storing means further comprises manually actuable means for controlling the entry of said selected control parameters and said displayed work path sequence element, and means for advancing said predetermined work path sequence.

34. The supervisory programming unit of claim 33 wherein said manually actuable control parameter means comprises a first predetermined number of group condition selectors.

35. The supervisory programming unit of claim 34 wherein said control parameter selecting means further comprises a predetermined number of manually operable parameter selectors associated with each of said group condition selectors.

36. The supervisory programming unit of claim 35 wherein said group condition selectors comprise a second predetermined number of group condition selectors of a first control parameter group type and a third predetermined number of group condition selectors of a second control parameter group type.

37. In a programmable manipulator having an arm movable in a plurality of axes,
means for generating signals during a teach phase representing positions described by one end of said arm as the end of the arm is moved along a desired sequence of work paths in a work area over which said arm is to be moved during a subsequent playback cycle;
manipulator memory means for storing said generated signals as digital position representation signals as the end of said arm is moved during said teach phase;
teach control means manually operable by an operator during said teach phase for generating a predetermined signal as each different sequential work path is taught;
supervisory programming means for storing different control parameter representation as one of a predetermined number of control data groups during an initial supervisory programming phase prior to said teach phase, said control data groups being stored in a sequence format corresponding to and being associated with said sequence of work paths, one or more of said control data groups being assigned, entered and stored in said supervisory programming means for one or more of said respective work paths by the programmer during said supervisory programming mode, said control parameters representing movement and control of said arm independent of work path distance and the position of said arm, said supervisory programming means comprising,
control data group entering means actuable by a programmer for entering said control data groups during said supervisory programming phase,
a predetermined number of control parameter setting means being associated with said control group entering means, one of said control parameter setting means being provided for and being associated with each of said control data groups,
sequence element display means for identifying said sequence of work paths, one or more of said control data groups being entered and stored in said supervisory programming means for one or more of said work paths by the programmer during said supervisory programming mode,
a predetermined number of function determining means, one of said function determining means being provided for and associated with each of said parameter setting means, and
means responsive to said teach control means during said teach phase for outputting the stored control data groups associated with the corresponding work path to said manipulator memory means as each work path is being taught, said manipulator memory means storing said digital position representation signals representing positions along said work paths and said associated control data groups in a predetermined format; and
playback control means being operative during a playback cycle and jointly responsive to said stored control data groups and said stored position representation signals for moving said arm along each of said work paths in said desired sequence, said playback control means comprising work path modification means responsive to said stored control data groups and said parameter function determining means for generating work path modification signals to move said arm along and about said taught work paths in accordance with the control parameters of said control parameter setting means.

38. The programmable manipulator of claim 37 wherein said work path modification signals represent movement of the manipulator arm back and forth across said work path.

39. The programmable manipulator of claim 38 wherein said work path modification signals also represent the relative speed of movement along the work path.

40. The programmable manipulator of claim 38 wherein said work path modification signals represent a path about the work path defining predetermined geometric excursions with respect to the work paths.

41. The programmable manipulator of claim 37 wherein said work path modification signal means further comprises means for generating a predetermined, selected path parameters representative of positional changes and movement with respect to the work path in accordance with the particular stored control parameters.

42. The programmable manipulator of claim 41 wherein said path parameter generating means comprises:
   deflection means for defining the peak amplitude of the work path modification normal to the work path and representing the end point of said predetermined pattern;
   end dwell means for defining a predetermined end dwell time interval during which the manipulator arm movement is inhibited at the end point of said predetermined pattern; and
   center dwell means for defining the extent of said predetermined pattern along the work path.

43. The programmable manipulator of claim 42 wherein said path parameter generating means further comprises means for defining the velocity of the manipulator arm along the work path and the relative velocity at which the manipulator arm moves in a direction out of the work path to said peak amplitude modification.

44. The programmable manipulator of claim 43 wherein said relative velocity defining means defines the slope of said predetermined pattern and the manipulator arm modification with respect to the work path.

45. The programmable manipulator of claim 41 wherein the work paths are linear paths and said predetermined pattern is a periodic wave, said work path modification signals superimposing said periodic wave on the linear paths.

46. The programmable manipulator of claim 37 wherein said control parameters comprise a first predetermined number of relative velocity modes along the work path and a second predetermined number of path modification modes with respect to the work path.

47. The programmable manipulator of claim 37 which includes a welding gun positioned on the end of said arm during movement thereof by said playback means, and said assigned control parameters correspond to different welding speeds at which said gun is to be moved along different ones of said series of work paths during playback.

48. The programmable manipulator of claim 37, which includes a welding gun positioned on the end of said arm during movement thereof by said playback means, and said assigned control parameters correspond to different weaving speeds at which said gun is to be moved generally transversely to different ones of said series of work paths during playback.

49. The programmable manipulator of claim 48, wherein said assigned control parameter include a component corresponding to a desired end dwell at the maximum weave displacement of said gun relative to the work path during playback.

50. The programmable manipulator of claim 37, which includes a guide wheel positioned on the end of said arm during said initial teaching operation for rolling engagement with an object in said predetermined work area as said arm is moved over said work path in said desired sequence, means for developing control pulses corresponding to said movement of said guide wheel, and means controlled by said control pulses for storing said series of digital signals.

51. The programmable manipulator of claim 50 which includes a welding gun positioned on the end of said arm during movement thereof by said playback means.

52. The programmable manipulator of claim 37 which includes means for mounting said arm so that the end thereof may be manually moved to any desired point in said work area during said initial teaching operation.

53. The programmable manipulator of claim 37 wherein said supervisory programming means further comprises control data display group display means for indicating the control data group being entered during said supervisory programming base into said supervisory programming means by said control data group entering means.

54. The programmable manipulator of claim 53 wherein said control data group entering means comprises control data group operating means responsive to said control data group outputting means for actuating said control data group display means to indicate the stored control data group in said supervisory programming means associated with each of said respective work paths as the control data group outputting means outputs the stored control data groups associated with the sequence of work paths.

55. The programmable manipulator of claim 54 wherein said control data group entering means comprises advance means for controlling the sequence element displayed by said sequence element display means and the entry of control data groups into said supervisory programming means.

* * * * *